US011962548B2

(12) United States Patent
Tian et al.

(10) Patent No.: US 11,962,548 B2
(45) Date of Patent: Apr. 16, 2024

(54) MESSAGE DISPLAY METHOD AND APPARATUS, DEVICE, AND STORAGE MEDIUM

(71) Applicant: TENCENT TECHNOLOGY (SHENZHEN) COMPANY LIMITED, Guangdong (CN)

(72) Inventors: Yuan Tian, Shenzhen (CN); Yijie Shen, Shenzhen (CN)

(73) Assignee: TENCENT TECHNOLOGIES (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/324,657

(22) Filed: May 19, 2021

(65) Prior Publication Data

US 2021/0273894 A1    Sep. 2, 2021

Related U.S. Application Data

(63) Continuation of application No. PCT/CN2020/077967, filed on Mar. 5, 2020.

(30) Foreign Application Priority Data

Mar. 29, 2019 (CN) .......................... 201910252455.5

(51) Int. Cl.
*H04L 51/046* (2022.01)
*G06F 3/0482* (2013.01)
(Continued)

(52) U.S. Cl.
CPC .......... *H04L 51/046* (2013.01); *G06F 3/0482* (2013.01); *G06F 40/166* (2020.01); *G06F 40/30* (2020.01)

(58) Field of Classification Search
CPC ....... H04L 51/046; H04L 51/22; H04L 51/32; H04L 12/1813; H04L 51/04; H04L 51/18;
(Continued)

(56) References Cited

U.S. PATENT DOCUMENTS 7,721,217 B2    5/2010  Bonforte et al.
9,436,709 B1*   9/2016  Anima .................. G06F 16/437
(Continued)

FOREIGN PATENT DOCUMENTS

CN    101119326 A    2/2008
CN    102215178 A    10/2011
(Continued)

OTHER PUBLICATIONS

International Search Report Issued in Application No. PCT/CN2020/077967 dated May 29, 2020, with English Translation, (5 pages).
(Continued)

*Primary Examiner* — Soe Hlaing
(74) *Attorney, Agent, or Firm* — ARENTFOX SCHIFF LLP

(57) ABSTRACT

This disclosure includes a message display method and apparatus, a device, and a storage medium. In the method, a message window of a first message group is displayed. The message window is configured to display messages of the first message group from a plurality of user accounts. A first message in the message window of the first message group is added to a grouped message window. The grouped message window is configured to display messages associated with a topic of the first message. Further, the messages associated with the topic are from at least one message group.

20 Claims, 21 Drawing Sheets

(51) Int. Cl.
*G06F 40/166* (2020.01)
*G06F 40/30* (2020.01)

(58) Field of Classification Search
CPC ...... G06F 3/0482; G06F 40/166; G06F 40/30; G06F 9/451
See application file for complete search history.

(56) References Cited

U.S. PATENT DOCUMENTS

| | | | |
|---|---|---|---|
| 2005/0262199 A1* | 11/2005 | Chen | H04L 51/04 709/204 |
| 2016/0364368 A1* | 12/2016 | Chen | H04L 51/216 |
| 2017/0155607 A1* | 6/2017 | Chakra | G06F 16/287 |
| 2018/0219823 A1* | 8/2018 | Mohan | G06Q 10/107 |
| 2018/0324116 A1* | 11/2018 | Vaduva | G06F 3/0482 |
| 2018/0356952 A1* | 12/2018 | Boothroyd | G06Q 10/10 |
| 2020/0057808 A1* | 2/2020 | Dunne | H04L 51/046 |
| 2020/0084170 A1* | 3/2020 | Mutha | G06N 20/20 |

FOREIGN PATENT DOCUMENTS

| | | |
|---|---|---|
| CN | 102970210 A | 3/2013 |
| CN | 103051522 A | 4/2013 |
| CN | 103841525 A | 6/2014 |
| CN | 105376148 A | 3/2016 |
| CN | 105407037 A | 3/2016 |
| CN | 105450497 A | 3/2016 |
| CN | 106506323 A | 3/2017 |
| CN | 110138645 A | 8/2019 |
| WO | WO2008/014116 A1 | 1/2008 |

OTHER PUBLICATIONS

Written Opinion Issued in Application PCT/CN2020/077967 dated May 29, 2020 (4 pages).
Chinese Office Action Issued in Application CN201910252455.5 dated Jan. 21, 2021, with concise English Translation, (15 pages).
Shi Yu Hong Ni, "Initiating Topics in QQ Group Chats", Baidu, https://jingyan.baidu.com/article/f54ae2fc004dc01e92b8492b.html, Nov. 21, 2015 (pages).
Randolph M. Forlenza et al. "Control options for instant message display and notification", https://www.freepatentonline.com/9563876.html, Feb. 7, 2017 (pages).

* cited by examiner

Concatenated message

Problems encountered in requirements of research and development of group sending 

| 11:12 Today | Develop a group chat at a customer service desktop | yukarizhang

This is distributed with a person stream

| 11:22 Today | A chat with yukarizhang | yukarizhang

Needed to be processed according to background synchronization

| 11:33 Today | Develop a group chat at a customer service desktop | yukarizhang

This needs to be processed in this way

☐ bobby

There's something wrong with that, maybe we'll check it again

↝ My feedback

Messages of enterprise group sending need to be processed in real time synchronously    343 / 3431 / 3432 / 3433

☐ Also send to a current chat  ~3451    344

Share to other chats    @ who    Send
3452    3453

FIG. 9

MESSAGE DISPLAY METHOD AND APPARATUS, DEVICE, AND STORAGE MEDIUM

RELATED APPLICATIONS

This application is a continuation of International Application No. PCT/CN2020/077967, entitled "CONVERSATION MESSAGE DISPLAY METHOD, APPARATUS, DEVICE, AND STORAGE MEDIUM" and filed on Mar. 5, 2020, which claims priority to Chinese Patent Application No. 201910252455.5, filed with the China National Intellectual Property Administration entitled "CHAT MESSAGE DISPLAY METHOD AND APPARATUS, DEVICE, AND STORAGE MEDIUM" and filed on Mar. 29, 2019. The entire disclosures of the prior applications are hereby incorporated by reference in their entirety.

FIELD OF THE TECHNOLOGY

This disclosure relates to the field of instant messaging (IM), including a chat message display method and apparatus, a device, and a storage medium.

BACKGROUND OF THE DISCLOSURE

In an IM program, messages are communicated through a chat between different contacts. The chat may be a normal chat between two contacts, or may be a group chat of three or more contacts.

Using a group chat as an example, three or more users belonging to different areas (e.g., departments) discuss the research and development of a software product in the same group chat. Chat messages in the discussion process include, but are not limited to at least one of a text message, an audio message, a picture message, a video message, and an emoji message.

Contacts in different areas care about different topic content, and therefore, the same chat group may have a plurality of topics, for example, a user A and a user B are discussing an interface design of the software product, the user B and a user C are discussing a technique implementation of the software product, and a user D and a user E are discussing a commercial prospect of the software product. A user needs to go back and forth across different locations of the group chat to look up chat messages for topics of interest, which can result in relatively low operation efficiency.

SUMMARY

Embodiments of this disclosure provide a message display method and apparatus, a device, and a non-transitory computer-readable storage medium. The embodiments can help address a problem of relatively low operation efficiency caused when there may be a plurality of topics in the same message group and a user needs to go back and forth across different locations to look up messages for topics of interest.

According to an aspect of this disclosure, a message display method is provided. In the method, a message window of a first message group is displayed. The message window is configured to display messages of the first message group from a plurality of user accounts. A first message in the message window of the first message group is added to a grouped message window. The grouped message window is configured to display messages associated with a topic of the first message. The messages associated with the topic are from at least one message group.

According to an aspect of this disclosure, an apparatus is provided. The apparatus includes processing circuitry configured to display a message window of a first message group. The message window is configured to display messages of the first message group from a plurality of user accounts. The processing circuitry is configured to add a first message in the message window of the first message group to a grouped message window. The grouped message window is configured to display messages associated with a topic of the first message. The messages are associated with the topic being from at least one message group.

According to an aspect of this disclosure, a non-transitory computer-readable storage medium is provided. The non-transitory computer-readable storage medium stores instructions which when executed by a processor cause the processor to perform a method. In the method, a message window of a first message group is displayed. The message window is configured to display messages of the first message group from a plurality of user accounts. A first message in the message window of the first message group is added to a grouped message window. The grouped message window is configured to display messages associated with a topic of the first message. The messages associated with the topic are from at least one message group.

According to an aspect of this disclosure, a chat message display method is provided. In the method, a chat message window of a first chat group is displayed, the chat message window being configured to display chat messages between user accounts in a target group. A trigger operation triggered for a first chat message in the chat message window is received. The first chat message in a concatenated message window is displayed according to the trigger operation, the concatenated message window being configured to display chat messages under a topic to which the first chat message belongs, the topic including chat messages from at least one chat group.

According to an aspect of this disclosure, a chat message display method is provided. In the method, chat messages of member user accounts in a first chat group are received. A chat message window of the first chat group is displayed, the chat message window being configured to display the received chat messages. When the chat message satisfies a preset condition, the chat message is added to a concatenated message window for display, the concatenated message window being configured to display chat messages under a topic corresponding to the chat message, the topic including chat messages from at least one chat group.

According to an aspect of this disclosure, a chat message display method is provided. In the method, a chat group list is displayed. A selection operation for at least one chat group in the chat group list is received. A chat message that satisfies a preset condition in the selected chat group is determined, and the chat message that satisfies the preset condition is added to a concatenated message window for display, the concatenated message window being configured to display chat messages under a topic corresponding to the chat message, the topic including chat messages from at least one chat group.

According to an aspect of this disclosure, a chat message display method is provided. In the method, a second chat message in a concatenated message window is determined, the concatenated message window being configured to display chat messages under a topic corresponding to the second chat message, the topic including chat messages from at least one chat group. An interaction message that interacts with the second chat message is received. The interaction message is transmitted to a visible range, the visible range including at least one of a topic to which the second chat message belongs, a second chat group to which the second chat message belongs, and a chat group other than the second chat group.

According to an aspect of this disclosure, a chat message display apparatus is provided, the apparatus including a display module and an interaction module. The display module is configured to display a chat message window of a first chat group, the chat message window being configured to display chat messages between user accounts. The interaction module is configured to receive a trigger operation triggered for a first chat message in the chat message window. The display module is further configured to display the first chat message in a concatenated message window according to the trigger operation, the concatenated message window being configured to display chat messages under a topic corresponding to the first chat message, the topic including chat messages from at least one chat group.

According to an aspect of this disclosure, a chat message display apparatus is provided, the apparatus including an interaction module and a display module. The interaction module is configured to receive chat messages of member user accounts in a first chat group. The display module is configured to display a chat message window of the first chat group, the chat message window being configured to display the received chat messages. The display module is further configured to add, when the chat message satisfies a preset condition, the chat message to a concatenated message window for display, the concatenated message window being configured to display chat messages under a topic corresponding to the chat message, the topic including chat messages from at least one chat group.

According to an aspect of this disclosure, a chat message display apparatus is provided, the apparatus including a display module and a receiving module. The display module is configured to display a chat group list. The receiving module is configured to receive a selection operation for at least one chat group in the chat group list. The display module is further configured to determine a chat message that satisfies a preset condition in the selected chat group, and add the chat message that satisfies the preset condition to a concatenated message window for display, the concatenated message window being configured to display chat messages under a topic corresponding to the chat message, the topic including chat messages from at least one chat group.

According to an aspect of this disclosure, a chat message display apparatus is provided, the apparatus including an interaction module and a transmission module. The interaction module is configured to determine a second chat message in a concatenated message window, the concatenated message window being configured to display chat messages under a topic corresponding to the second chat message, the topic including chat messages from at least one chat group. The interaction module is further configured to receive an interaction message that interacts with the second chat message. The transmission module is configured to transmit the interaction message to a visible range, the visible range including at least one of a topic to which the second chat message belongs, a second chat group to which the second chat message belongs, and a chat group other than the second chat group.

According to an aspect of this disclosure, a chat message display apparatus is provided, the apparatus being applicable to a server, and the apparatus including a receiving module, a topic storage module, and a transmission module. The receiving module is configured to receive a topic creation request transmitted by a terminal, the topic creation request being transmitted by the terminal after a topic creation operation triggered for a first chat message in a chat message window is received, the chat message window being configured to display chat messages between user accounts in a target group. The topic storage module is configured to allocate a topic identifier of a new topic according to a topic name in the topic creation request. The transmission module is configured to transmit the topic identifier to the terminal, the terminal being configured to display a concatenated message window according to the topic identifier, the concatenated message window being configured to display chat messages under a topic to which the first chat message belongs, the topic including chat messages from at least one chat group and based on the same discussed topics.

According to an aspect of this disclosure, a terminal is provided, the terminal including a processor and a memory, the memory storing at least one instruction, at least one program, a code set, or an instruction set, the at least one instruction, the at least one program, the code set, or the instruction set being loaded and executed by the processor to implement any one of the foregoing aspects.

According to an aspect of this disclosure, a server is provided, the server including a processor and a memory, the memory storing at least one instruction, at least one program, a code set, or an instruction set, the at least one instruction, the at least one program, the code set, or the instruction set being loaded and executed by the processor to implement any one of the foregoing aspects.

According to an aspect of this disclosure, a non-transitory computer-readable storage medium is provided, the non-transitory computer-readable storage medium storing instructions which when executed by a processor cause the processor to perform any of the methods according to the foregoing aspects.

According to an aspect of this disclosure, a computer program product is provided, the computer program product storing a computer program, the computer program, when executed by a processor, implementing any of the methods according to the foregoing aspects.

A concatenated message interface is displayed according to a trigger operation by a user triggered for a first chat message in a chat message window, the concatenated message interface being configured to display chat messages that are aggregated under the same topic. The chat messages under the same topic may be chat messages from different locations in the same chat, or may be chat messages from different locations in different chats. Therefore, the user can aggregate and view chats under the same topic in the concatenated message window, and does not need to switch between different locations in the same chat or different locations in different chats, thereby saving a switching operation of the user and providing man-machine interaction efficiency between the user and the IM program.

BRIEF DESCRIPTION OF THE DRAWINGS

To describe the technical solutions in embodiments of this disclosure more clearly, the following briefly describes the accompanying drawings required for describing the embodiments. The accompanying drawings in the following descriptions show only some embodiments of this disclosure, and a person of ordinary skill in the art may still derive other accompanying drawings from the accompanying drawings.

FIG. 9 is a schematic interface diagram of a concatenated message interface according to an embodiment of this disclosure.

DESCRIPTION OF EMBODIMENTS

Figure 1:
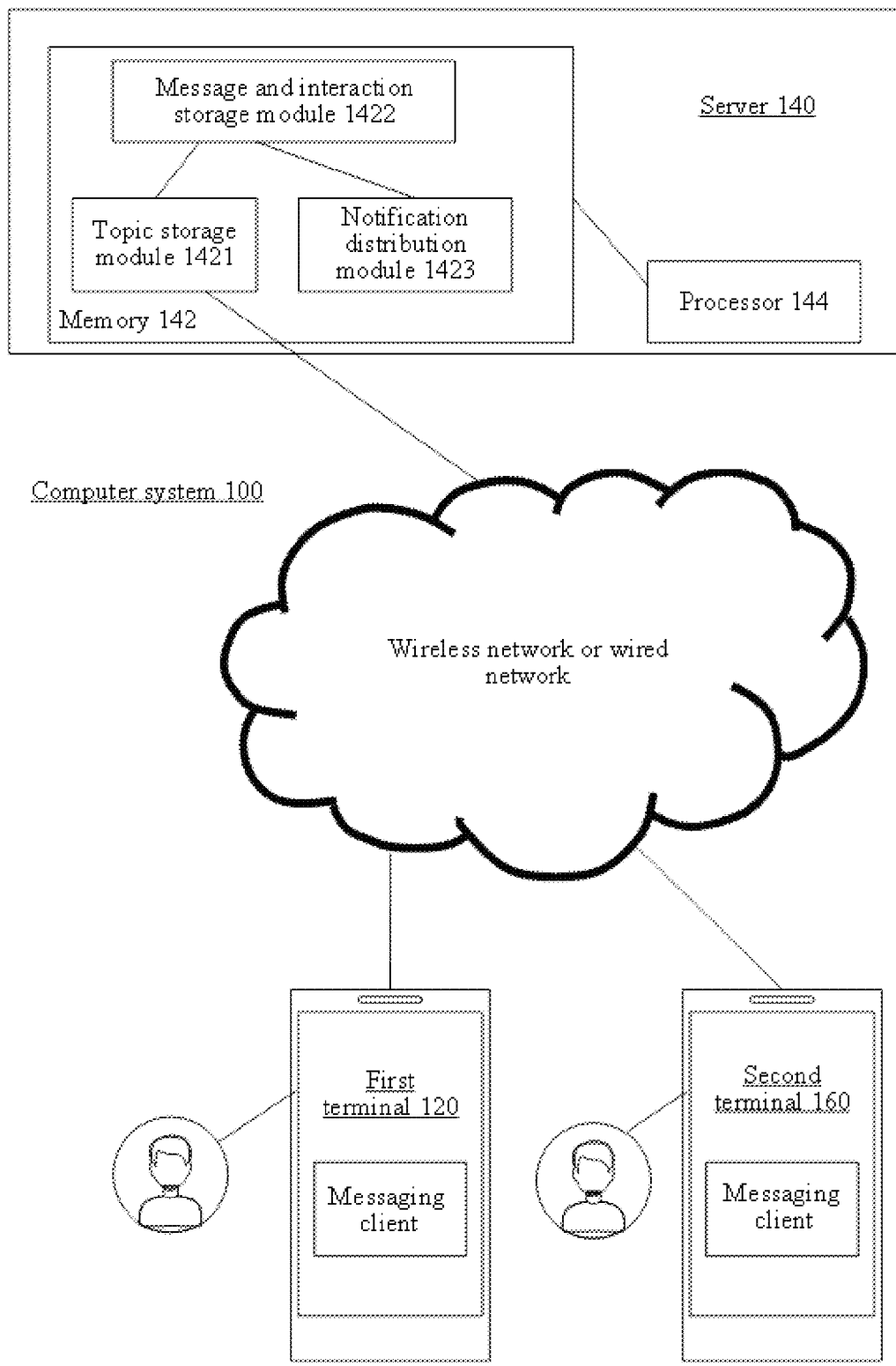
FIG. 1 is a block diagram of a computer system according to an embodiment of this disclosure.

To make objectives, technical solutions, and advantages of this disclosure clearer, the following further describes exemplary implementations of this disclosure in detail with reference to the accompanying drawings.

First, several terms used in the embodiments of this disclosure are briefly introduced.

An IM program is a program that can transmit and receive Internet messages instantly.

A messaging program can be an IM program designed for users. For example, users can carry on work dialogs by using a messaging client, or may perform at least one of office functions such as file transmission, information statistics, daily attendance, meeting reservation, and mail exchange by using the messaging client, to assist personnel to work and implement cooperative working between the personnel. In a case of an enterprise environment, compared with normal friends chains in an IM client, social relationship chains in the messaging client can be relationship chains created based on department division within the enterprise and a leader-member relationship.

A chat group is a set that contacts in the same group communicate with messages in an IM program. For a two-person chat, there are two contacts in a chat group. For a group chat, there are three or more contacts in a chat group. Usually, a quantity of contacts in a chat group is relatively fixed, but a contact having a chat management permission can add, delete, and modify contacts in the chat. For the messaging program, a quantity of contacts in the chat group may be dynamically changed according to the entry and departure of users, such as employees in an enterprise setting. The chat group is used for performing an aggregation management on chat messages of contacts in the same group.

A concatenated message topic, hereinafter referred to as a topic, is a message set formed by concatenating messages formed for the same chat topic in the IM program. Messages under the same topic may be dispersed at different locations in the same chat, or may be dispersed at different locations in different chats. The concatenated message topic is used for performing the aggregation management (e.g., concatenating to the same window or timeline for display) on chat messages in one or more chat groups by using the topic as a center.

In a work communication scenario or a life communication scenario based on the IM program, a discussion in a group may cover a plurality of topics dispersedly and uncontrollably. However, there topics may be dispersed at different locations of the same chat group at the same time, or may be dispersed at different locations of a plurality of chat groups. If the user wants to view chat messages of one topic, the user needs to search for related chat messages at different locations, which can result in relatively low viewing efficiency, and information that the user is interested in cannot be obtained rapidly.

Embodiments of this disclosure provide a chat message display method, which can perform a concatenation display (or an aggregation display) on chat messages at different locations or of the same topic in different chats.

FIG. 1 is a structural block diagram of a computer system 100 according to an exemplary embodiment of this disclosure. The computer system 100 may be a messaging system, such as an instant messaging system, or another application (APP) system having a social attribute. This is not limited in this embodiment of this disclosure. The computer system 100 can include a first terminal 120, a server 140, and a second terminal 160.

The first terminal 120 is connected to the server 140 by using a wireless network or a wired network. The first terminal 120 may be at least one of a smartphone, a game console, a desktop computer, a tablet computer, an ebook reader, an MP3 player, an MP4 player, and a portable laptop computer. An APP supporting an IM function is installed and run on the first terminal 120. The APP may be a messaging system, such as an instant messaging system, or another APP system having a social attribute. In some examples, the APP may be a messaging client. The first terminal 120 is a terminal used by a user, and a first user account logs in to the messaging client in the first terminal 120.

The first terminal 120 is connected to the server 140 by using a wireless network or a wired network.

The server 140 includes at least one of one server, a plurality of servers, a cloud computing platform, and a virtualization center. The server 140 is configured to provide a background service to a supporting APP.

In some examples, the server 140 includes a memory 142 and processing circuitry, such as a processor 144.

The memory 142 stores one or more program instructions, and the program instruction form one or more logical program function modules. The program function module includes, but is not limited to: a topic storage module 1421, a message and interaction storage module 1422, and a notification distribution module 1423.

An APP having a social attribute is installed and run on the second terminal 160. The APP may be a messaging system, such as an instant messaging system, or another APP system having a social attribute. In some examples, the APP may be a messaging client. The second terminal 160 is a terminal used by personnel, and a second user account logs in to the messaging client in the second terminal 160.

In some examples, the first user account and the second user account are in a virtual social network, and the virtual social network includes a social relationship chain between the first user account and the second user account. The virtual social network may be provided by the same social platform, or may be provided by a plurality of social platforms with an associated relationship (e.g., an authorized login relationship) cooperatively. A specific form of the virtual social network is not limited in this embodiment of this disclosure. In some examples, the first user account and the second user account may belong to the same team or the same organization, have a friend relationship or have temporary communication permission. In some examples, the first user account and the second user account may be also in a stranger relationship. The virtual social network can provide a one-way message propagation approach or a two-way message propagation approach between the first user account and the second user account.

In some examples, the APPs installed on the first terminal 120 and the second terminal 160 are the same, or the APPs installed on the two terminals are the same type of APPs of different operating system platforms, or the APPs installed on the two terminals are different but support the information mutual communication. The different operating systems can include an Apple operating system, an Android operating system, a Linux operating system, a Windows operating system, and the like.

The first terminal 120 may generally refer to one of a plurality of terminals, the second terminal 160 may generally refer to one of a plurality of terminals, and in this embodiment, and description is made by using only the first terminal 120 and the second terminal 160 as an example. Terminal types of the first terminal 120 and the second terminal 160 are the same or different. The terminal type includes at least one of a smartphone, a game console, a desktop computer, a tablet computer, an ebook reader, an MP3 player, an MP4 player, and a laptop computer. The following embodiments are described by using an example in which the first terminal 120 and/or the second terminal 140 is a smartphone, and there is a friend relationship chain or a friend relationship chain between the first user account and the second user account.

A person skilled in the art would understand that there may be more or fewer terminals. For example, there may be only one terminal, or there may be dozens of or hundreds of terminals or more.

Figure 2:
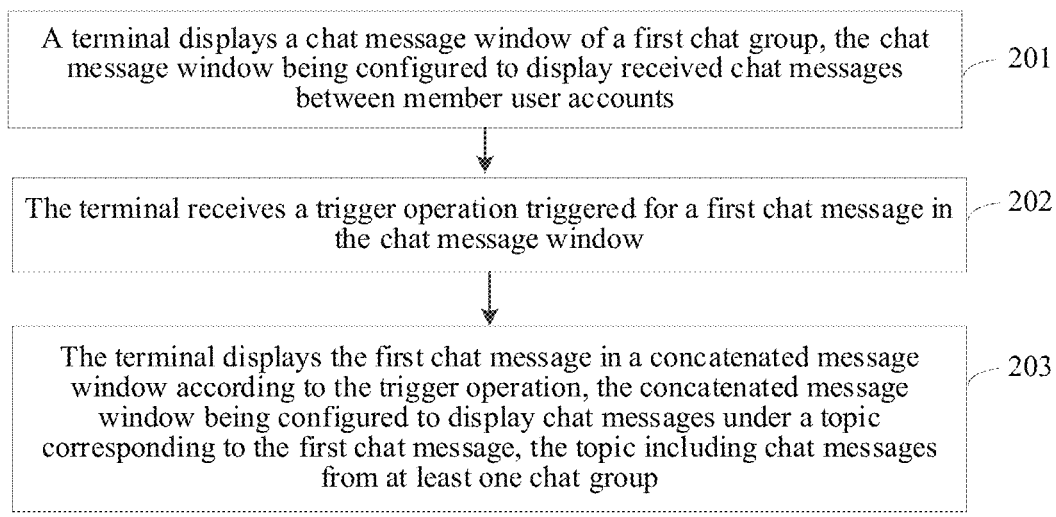
FIG. 2 is a flowchart of a chat message display method according to an embodiment of this disclosure.

FIG. 2 is a flowchart of a message display method, such as a chat message display method, according to an exemplary embodiment of this disclosure. The method may be performed by the terminal shown in FIG. 1, and an APP supporting an IM function is run on the terminal. The method can include the following operations.

In step 201, a terminal displays a chat message window of a first chat group, the chat message window being configured to display received chat messages between member user accounts. For example, a message window of a first message group is displayed, the message window being configured to display messages of the first message group from a plurality of user accounts.

The chat group is a messaging set performing message communication by using a contact group. The contact group includes two contacts (two-person chat), or three or more contacts (group chat).

An APP supporting an IM function is run on the terminal. The first chat may be any one chat in a plurality of chats in the APP. In some embodiments, the first chat is a group chat with three or more contacts, for example, the first chat may be a chat with a quantity of people greater than a threshold (e.g., 10 people). The first chat is not limited in this embodiment, and an example in which the first chat is any chat is used for description.

A chat message window is a user interface for displaying chat messages in a current chat in a timeline manner. The chat message is a message transmitted by a member user account, and a form of the message includes, but is not limited to: at least one of text, an emoji, a picture, an audio, a video, a file, and a link. Each chat message corresponds to at least one timestamp of its own message acquisition time, message transmission time, and message receiving time, and each chat message further corresponds to a message publisher (e.g., a member user account that transmits the chat message).

In some examples, each chat message has a corresponding message region in the chat message window. When the chat messages are organized in a timeline manner, chat messages are sorted and displayed in the chat message window in chronological order, and each chat message occupies a row of a region in the chat message window.

In step 202, the terminal receives a trigger operation triggered for a first chat message in the chat message window. For example, a trigger operation that is performed on the first message in the message window to add the first message to the grouped message window is received.

The trigger operation is an operation for adding or creating the first chat message to one topic. Alternatively, the trigger operation is an operation for viewing a topic to which the first chat message belongs.

In some examples, the trigger operation includes one operation. The trigger operation includes at least one operation of a tap operation, a double-tap operation, a long press operation, a leftward slide operation, and a rightward slide operation for the first chat message or a message region of the first chat message.

In some examples, the trigger operation includes two operations. The trigger operation includes: first performing at least one operation of a tap operation, a double-tap operation, a long press operation, a leftward slide operation, and a rightward slide operation for the first chat message or a message region of the first chat message, and then performing a confirmation operation in a pop-up window.

In some examples, the trigger operation includes a plurality of operations. The trigger operation includes: first performing a multiple selection on a plurality of first chat messages or message regions of the first chat messages, and then performing a confirmation operation in a pop-up window.

In step 203, the terminal displays the first chat message in a concatenated message window according to the trigger operation, the concatenated message window being configured to display chat messages under a topic corresponding to the first chat message, the topic including chat messages from at least one chat group. For example, the first message is displayed in the grouped message window.

There may be one or more chat messages under the same topic. When there are a plurality of chat messages under the same topic, at least two chat messages may belong to the same chat group, or at least two chat messages may belong to different chat groups.

In some examples, the topic includes chat messages belonging to the same discussed topic from more than two chat groups. More than two chats are different chats in which a current user account participates. That is, the concatenated message interface has a function of performing concatenation display (or an aggregation display) on chat messages belonging to the same topic in different chats.

In some examples, the terminal adds and displays the concatenated message window at a designated location of an APP according to a trigger operation, and displays the first chat message in the concatenated message window (in a current window region or historical message flow). The designated location and the chat message window are side by side, for example, an adjacent location at a right side of the chat message window, or an adjacent location under the chat message window. In this case, the user may view chat messages in a chat or may view chat messages under a topic at the same time. The chat message displayed in the concatenated message window is also referred to as a concatenated message.

In some examples, the "window" in the embodiments of this disclosure refers to a single window interface, or may be referred to as a window region divided logically on the user interface. Usually, the window is a rectangular or rounded rectangle.

Figure 3:
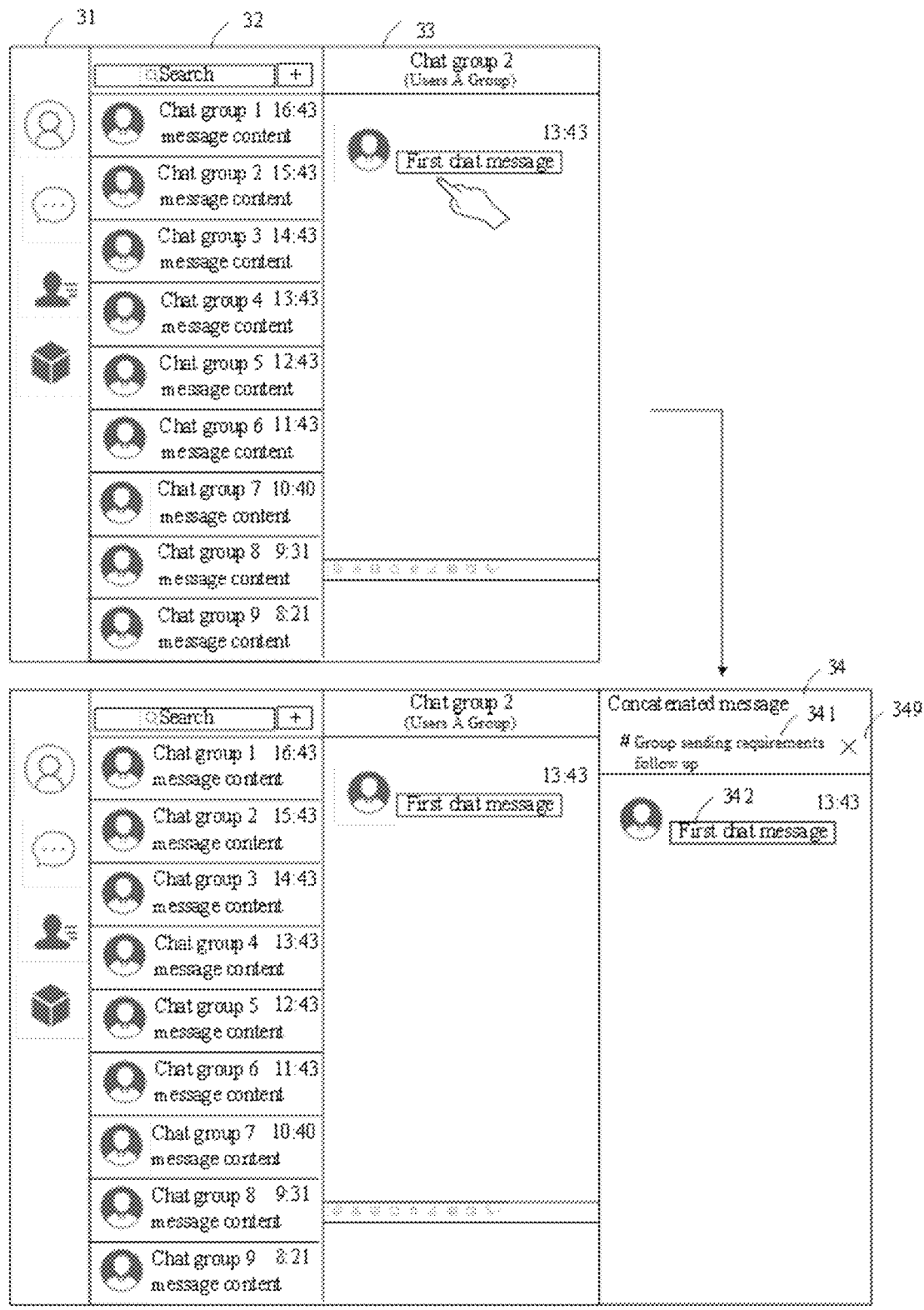
FIG. 3 is a schematic interface diagram of a concatenated message interface according to an embodiment of this disclosure.

FIG. 3 shows a user interface of a messaging application, such as an IM program. The user interface includes a function region 31, a chat group list 32, and a chat message interface 33 that are arranged from left to right. The function region 31 can be displayed with a personal page button, a chat group button, a contacts button, and a favorite list button from top to bottom. The personal page button is configured to view a personal page of a user who logged in locally, for example, a personal nickname, account, and QR code. The chat group button is configured to view related information of each created chat group. The contacts button is configured to view related information of added user accounts (contacts). The favorite list button is configured to view favorite web pages, pictures, articles, videos, and the like.

The chat group list 32 is a list displayed when the chat group button is triggered. The created chat groups are displayed in the chat group list 32, and the created chat groups are sorted and displayed in the chat group list 32 according to creation times or a receiving time of a latest message. The chat message interface 33 is configured to display a plurality of chat messages of the same chat group in a timeline manner in chronological order.

An example in which the first chat group is a chat group 2 is used, and chat messages in the chat group 2 are displayed in the chat message interface 33. When the user double-taps the first chat message, a concatenated message interface 34 is added to be displayed in a right side of the chat message interface 33. A topic name 341, a first chat message 342, and a close button 349 that are aggregated under the same topic are displayed in the concatenated message interface 34. The close button 349 is configured to close the concatenated message interface 34.

According to the method provided in this embodiment, a concatenated message interface is displayed according to a trigger operation by a user triggered for a first chat message in a chat message window, the concatenated message interface being configured to display chat messages that are aggregated under the same topic. The chat messages under the same topic may be chat messages from different locations in the same chat, or may be chat messages from different locations in different chats. Therefore, the user can aggregate and view chats under the same topic in the concatenated message window, and does not need to switch between different locations in the same chat or different locations in different chats, thereby saving a switching operation of the user and providing man-machine interaction efficiency between the user and the IM program.

The concatenated message interface in this embodiment of this disclosure includes, but is not limited to the following functions:

1. Topic creation function is a function that a user creates a new topic;
2. Message addition function is a function that a user adds a chat message to an existing topic;
3. Topic viewing function is a function of viewing a topic to which a chat message belongs in a chat message interface; and
4. Interaction function is a function that interacts with a concatenated message in a concatenated message interface, and the interaction function may have different visible ranges.

Different embodiments are used for respectively describing the foregoing functions.

Topic Creation Function

Figure 4:
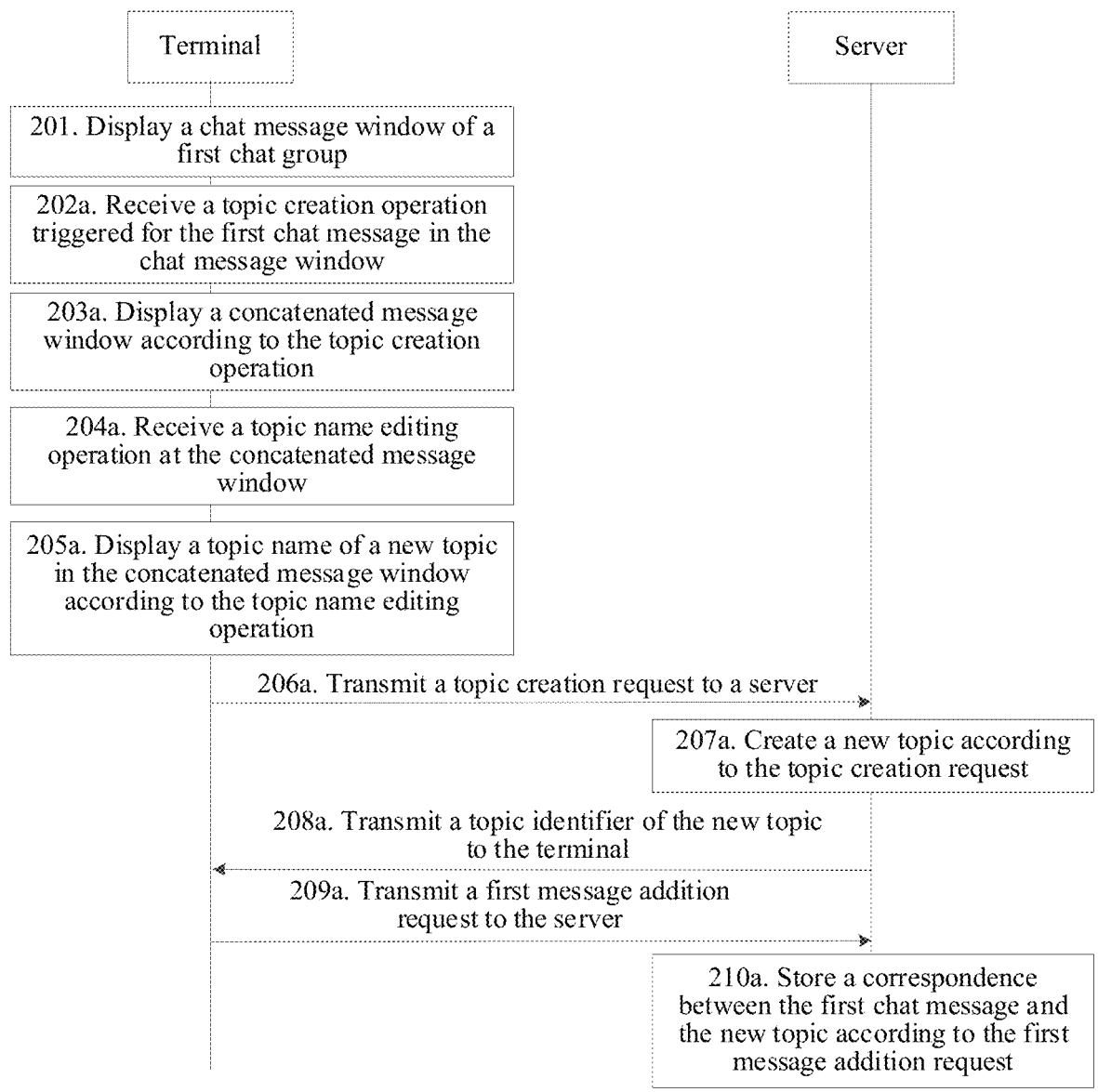
FIG. 4 is a flowchart of a chat message display method according to an embodiment of this disclosure.

In an embodiment based on FIG. 2, a user may create a topic based on any chat message. Step 202 in the foregoing method may alternatively be implemented as step 202a, and step 203 in the foregoing method may alternatively be implemented as step 203a, as shown in FIG. 4.

In step 201, a terminal displays a chat message window of a first chat group.

One or more chat messages belonging to the first chat group are displayed in the chat message window of the first chat group, and a first chat message is displayed in the chat message window.

In step 202a, the terminal receives a topic creation operation triggered for the first chat message in the chat message window.

The topic creation operation is an operation for creating a concatenated message topic.

In some examples, the topic creation operation includes at least one operation of tap, long press, double-tap, and slide for the first chat message or a message region of the first chat message. In some examples, the topic creation operation includes one operation, two operations, or a plurality of operations.

In step 203a, the terminal displays the concatenated message window according to the topic creation operation, the first chat message being displayed under a new topic in the concatenated message window.

The concatenated message window and the chat message window are two windows or window regions independent of each other.

In some embodiments, the concatenated message window and the chat message window are two windows or window regions side by side, for example, may be two windows are window regions horizontally disposed side by side, or may be two windows or window regions vertically disposed side by side. In some other embodiments, for example, on a smartphone with a relatively small screen, the concatenated message window may alternatively cover or partially cover the chat message window for display. This is not limited in this embodiment.

In some embodiments, at least two topics are displayed in the concatenated message window, each topic occupies a different region in the concatenated message window, and the first chat message is displayed under the new topic. In some examples, if the first chat message belongs to more than two topics at the same time, the first chat message is displayed under the two or more topics at the same time.

In step 204a, the terminal receives a topic name editing operation at the concatenated message window.

A topic name of the new topic defaults to empty. The user edits the topic name of the new topic by inputting in an input method manner or a voice input manner at a topic name region of the concatenated message window.

In some examples, the topic name is represented by using a combination of designated symbols and characters, for example, is represented by using a combination manner of "#+characters".

Referring to FIG. 3, the user inputs a topic name of "#group sending requirements follow up" in a topic name region 341.

In step 205a, the terminal displays the topic name of the new topic in the concatenated message window according to the topic name editing operation.

In step 206a, the terminal transmits a topic creation request to a server.

The topic creation request carries the topic name, a creation time, and a creator ID of the new topic.

In some examples, the terminal communicates with the topic storage module 1421 in the server through an interface #topic.

In step 207a, the server creates a topic according to the topic creation request.

The topic storage module 1421 in the server receives the topic creation request transmitted by the terminal. A process in which the topic storage module 1421 creates a concatenated message topic according to the topic creation request is maintained with the following data table 1.

TABLE 1

List of concatenated message topic

| Topic identifier (Topic ID) | Topic name | Creation time | Creator ID |
|---|---|---|---|
| ID 1 | Group sending requirements follow up | February 28 15:55 | UserID = 123 |

TABLE 1-continued

List of concatenated message topic

| Topic identifier (Topic ID) | Topic name | Creation time | Creator ID |
|---|---|---|---|
| ID 2 | Group sending function interface design | January 25 18:40 | UserID = 456 |

In step 208a, the server transmits a topic identifier of the new topic to the terminal.

The topic storage module 1421 transmits the topic identifier (ID) of the new topic to the terminal.

In step 209a, the terminal transmits a first message addition request to the server.

The first chat message is added to the new topic by default and becomes a first concatenated message under the new topic. Therefore, after obtaining the topic identifier, the terminal needs to transmits the first message addition request to the server.

In some examples, the first message addition request includes at least one of a topic identifier, a message identifier, message content, an acquisition time, a message publisher, a chat name, and a from chat ID.

In some examples, the terminal communicates with the message and interaction storage module 1422 in the server through an interface #topicID_msgID_fromChatID.

In step 210a, the server stores a correspondence between the first chat message and the new topic according to the first message addition request.

The message and interaction storage module 1422 receives the first message addition request transmitted by the terminal. The topic storage module 1421 acquires the first chat message to the new topic according to the first message addition request. The message and interaction storage module 1422 is maintained with the following data table, as shown in Table 2.

TABLE 2

Storage list of concatenated messages

| Topic identifier (TopicID) | Message identifier (MsgID) | Message content | Acquisition time | Message publisher ID | Chat name | From chat identifier (fromChatID) |
|---|---|---|---|---|---|---|
| 1111 | 123 | Closed test is coming | February 28 13:43 | Use1 | Users A group | Chat 2 |

According to the method provided in this embodiment, the user may create a concatenated message topic based on a first chat message in a chat message interface, which provides a chat message aggregation manner by using a topic as a center, and therefore, the user can view chat messages under the same topic conveniently. These chat messages may come from different locations of the same chat group, or may come from different locations of different chat groups, and therefore, a new chat message organization form is provided.

According to the method provided in this embodiment, by adding the first chat message to the new topic by default, the user only needs one or one group of trigger operations, the topic creation and message addition function may be completed conveniently, thereby saving user's operations.

The topic name of the new topic may alternatively be generated by the server automatically. Schematically, the server extracts a key word in the first chat message, and automatically generates the key word in the first chat message to the topic name of the new topic. Alternatively, the server uses the first chat message as the topic name of the new topic.

Message Addition Function

Figure 5:
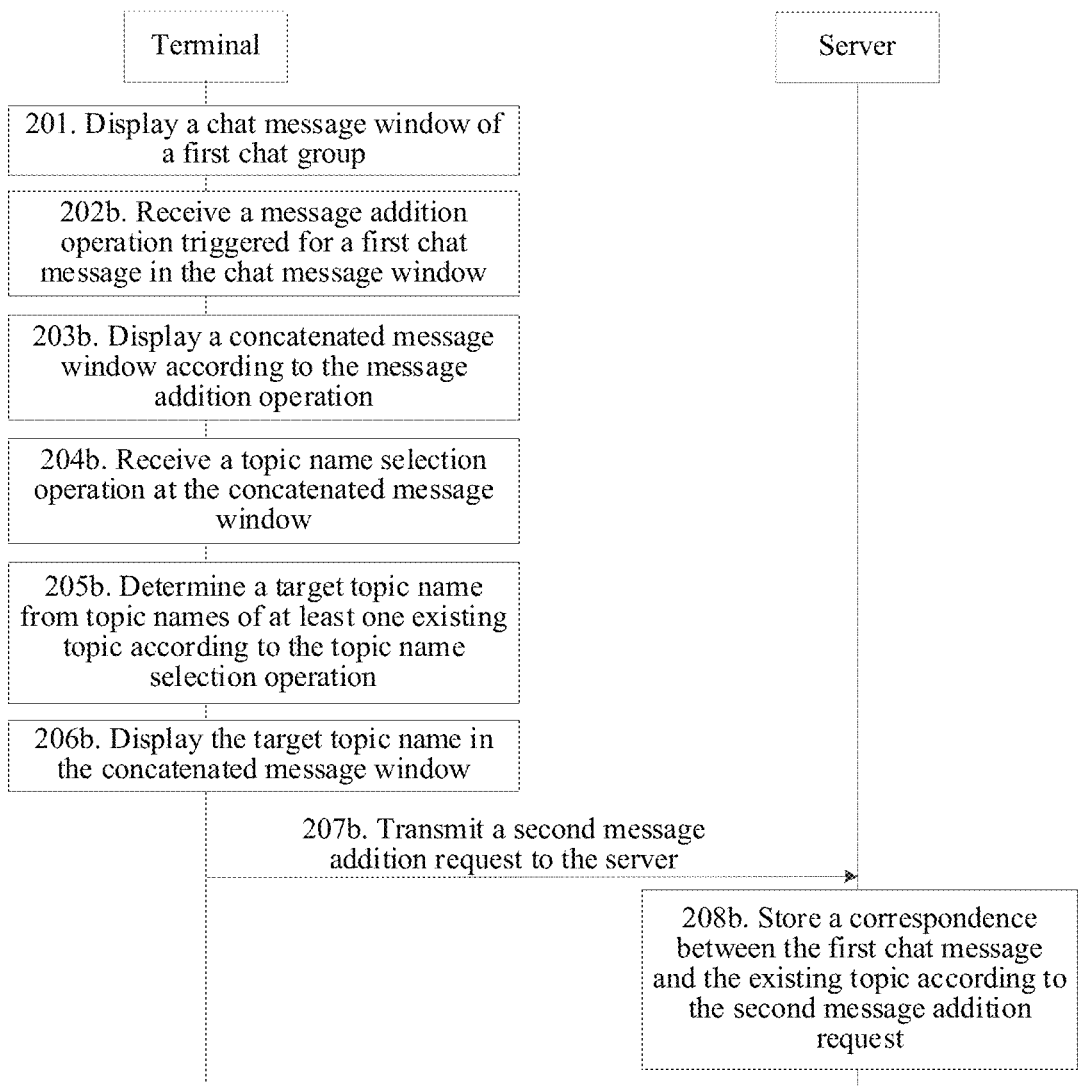
FIG. 5 is a flowchart of a chat message display method according to an embodiment of this disclosure.

In an embodiment based on FIG. 2, the user may add the first chat message to an existing topic. The existing topic includes a concatenated message topic created based on chat messages in other chat groups. Step 202 in the foregoing method may alternatively be implemented as step 202*b*, and step 203 in the foregoing method may alternatively be implemented as step 203*b*, as shown in FIG. 5.

In step 201, a terminal displays a chat message window of a first chat group.

One or more chat messages belonging to the first chat group are displayed in the chat message window of the first chat group, and a first chat message is displayed in the chat message window.

In step 202*b*, the terminal receives a message addition operation triggered for a first chat message in the chat message window.

The message addition operation is an operation for adding the first chat message to the existing topic. The message addition operation may be the same as the topic creation operation, or may be different from the topic creation operation.

In some examples, the message addition operation includes at least one operation of tap, long press, double-tap, and slide for the first chat message or a message region of the first chat message. In some examples, the topic creation operation includes one operation, two operations, or a plurality of operations.

In step 203*b*, the terminal displays the concatenated message window according to the message addition operation, the first chat message being displayed under the existing topic in the concatenated message window.

The concatenated message window and the chat message window are two windows independent of each other.

In some embodiments, the concatenated message window and the chat message window are two windows or window regions side by side, for example two windows that are window regions horizontally disposed side by side, or two windows or window regions that are vertically disposed side by side. In some other embodiments, for example, on a smartphone with a relatively small screen, the concatenated message window may alternatively cover or partially cover the chat message window for display. This is not limited in this embodiment.

In some embodiments, at least two topics are displayed in the concatenated message window, each topic occupies a different region in the concatenated message window, and the first chat message is displayed under the new topic. In some examples, if the first chat message belongs to more than two topics at the same time, the first chat message is displayed under the two or more topics at the same time.

In step 204*b*, the terminal receives a topic name selection operation at the concatenated message window.

The user selects the topic name of the existing topic in a pull-down menu selection manner or a key word search manner at a topic name region of the concatenated message window.

In step 205*b*, the terminal determines a target topic name from topic names of at least one existing topic according to the topic name selection operation.

The existing topic includes a concatenated message topic created based on chat messages in other chat groups for example. Other chat groups are chat groups different from the first chat group.

For example, the existing topic includes an "#group sending requirements follow up" and a "#group sending function interface design", and the user selects the "#group sending function interface design" from the two topic names as the added topic in the first chat message. The "#group sending function interface design" may be a topic created in a second chat group, and may alternatively be a topic created in the first chat. This is not limited in this embodiment of this disclosure.

In step 206*b*, the terminal displays the target topic name in the concatenated message window.

In step 207*b*, the terminal transmits a second message addition request to the server.

After obtaining the topic identifier, the terminal transmits the second message addition request to the server.

In some examples, the second message addition request includes at least one of a topic identifier, a message identifier, message content, an acquisition time, a message publisher, a chat name, and a chat ID.

In some examples, the terminal communicates with the message and interaction storage module 1422 in the server through an interface #topicID_msgID_fromChatID.

In step 208*b*, the server stores a correspondence between the first chat message and the existing topic according to the second message addition request.

The message and interaction storage module 1422 receives the second message addition request transmitted by the terminal. The topic storage module 1421 associates the first chat message to the existing topic according to the second message addition request. The message and interaction storage module 1422 can be maintained in a data table as shown in Table 2.

According to the method provided in this embodiment, the user may add a first chat message to an existing topic in the chat message interface, which provides a chat message aggregation manner by using a topic as a center, and therefore, the user can view chat messages under the same topic conveniently.

An existing topic to which the first chat message belongs may alternatively be determined by the terminal or the server. For example, the terminal determines a target topic name of a topic to which a first chat message belongs through key word extraction from topic names of at least one existing topic, that is, determines a topic name with a shortest semantic distance to the first chat message as the target topic name. Alternatively, the terminal transmits the first chat message to the server, and the server determines a target topic name of a topic to which the first chat message belongs from topic names of at least one existing topic through key word extraction. Then the server transmits the target topic name to the terminal for display.

Topic Viewing Function

Figure 6:
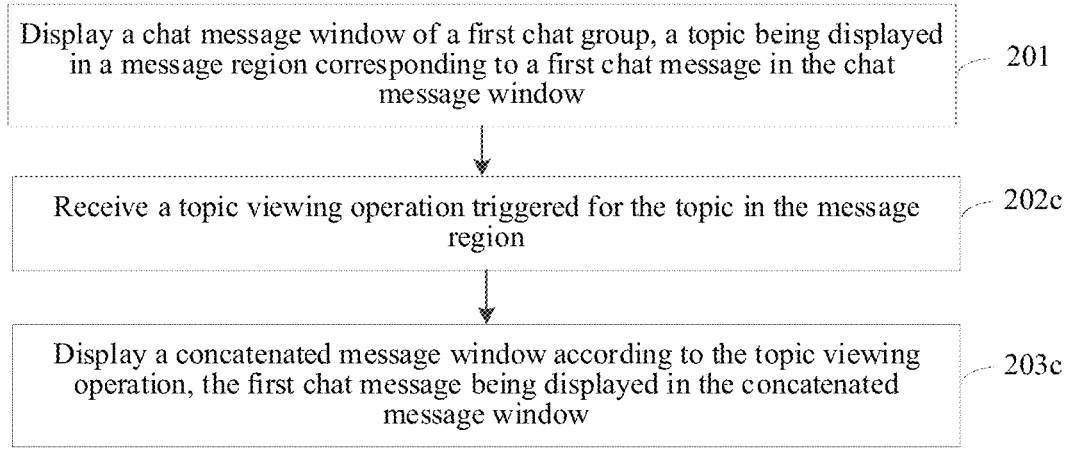
FIG. 6 is a flowchart of a chat message display method according to an embodiment of this disclosure.

In an embodiment based on FIG. 2, if a topic to which a first chat message belongs exists, the user may further view the topic to which the first chat message belongs in the chat message interface. Step 202 in the foregoing method may alternatively be implemented as step 202*b*, and step 203 in the foregoing method may alternatively be implemented as step 203*b*, as shown in FIG. 6.

In step 201, the terminal displays a chat message window of a first chat, a topic being displayed in a message region corresponding to a first chat message in the chat message window.

Figure 7:
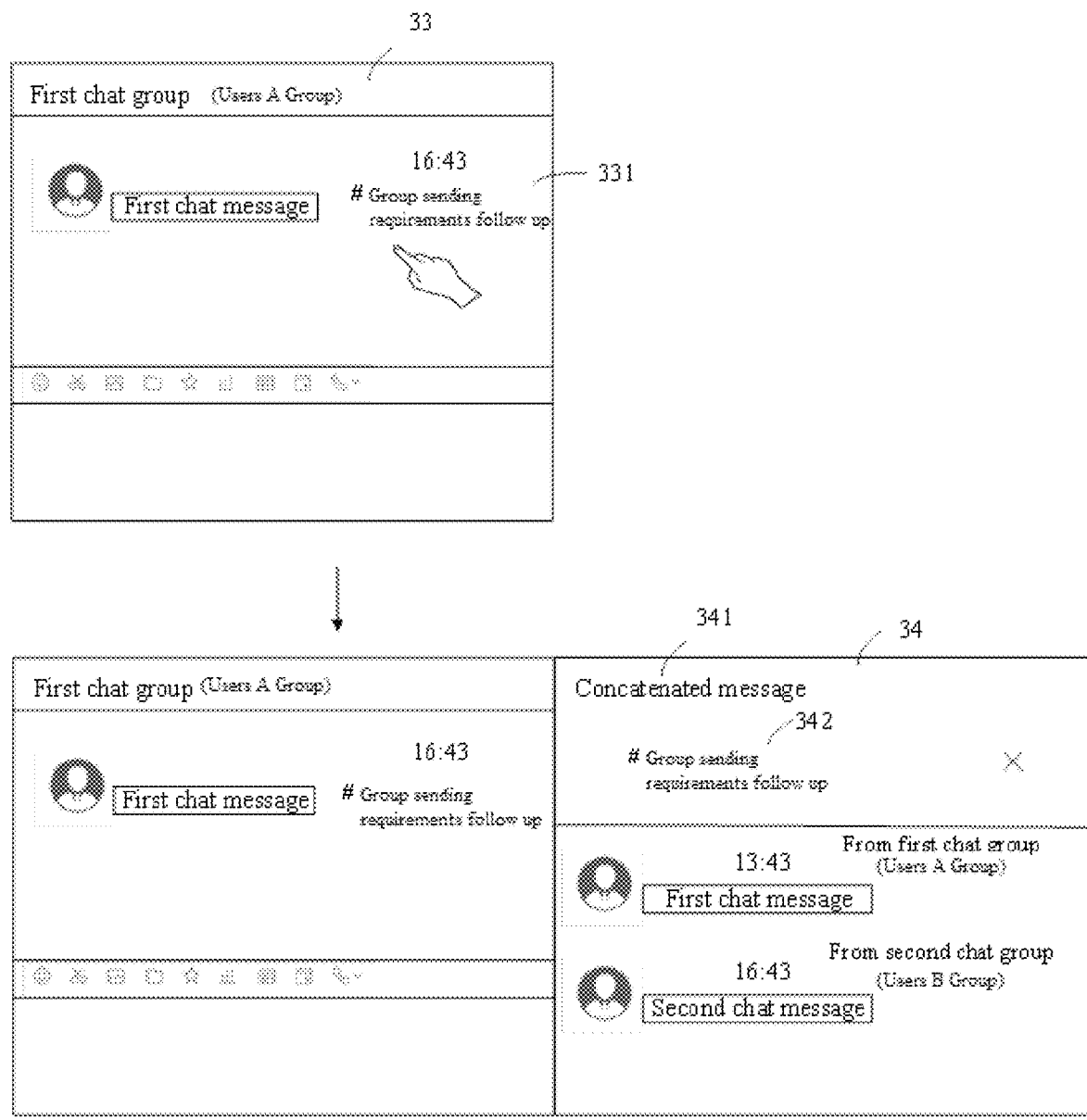
FIG. 7 is a schematic interface diagram of a concatenated message interface according to an embodiment of this disclosure.

If the topic to which the first chat message belongs exists, as shown in FIG. 7, a topic name of the topic is displayed in a message region corresponding to the first chat message in the chat message interface 33

In step 202c, the terminal receives a topic viewing operation triggered for the topic in the message region.

The topic viewing operation is an operation for viewing a topic to which the first chat message belongs.

In some examples, the topic viewing operation may be the same as the topic creation operation, or may be different from the topic creation operation. The topic viewing operation may be the same as the message addition operation, or may be different from the message addition operation.

In some examples, the topic viewing operation includes at least one operation of tap, long press, double-tap, and slide for the first chat message or a message region of the first chat message. In some examples, the topic creation operation includes one operation, two operations, or a plurality of operations.

For example, the first chat message belongs to two topics at the same time, and topic names of the two topics are displayed in the chat message interface at the same time, and the user taps the topic name of one topic, to trigger a topic viewing operation of viewing the topic.

In step 203c, the terminal displays a concatenated message window according to the topic viewing operation, the first chat message being displayed in the concatenated message window.

In some embodiments, the concatenated message window and the chat message window are two windows or window regions side by side, for example two windows or window regions that are horizontally disposed side by side, or two windows or window regions that are vertically disposed side by side. In some other embodiments, for example, on a smartphone with a relatively small screen, the concatenated message window may alternatively cover or partially cover the chat message window for display. This is not limited in this embodiment.

In some examples, a source chat of the first chat message is displayed in a message region of the first chat message in the concatenated message window.

According to the method provided in this embodiment, the user may add a first chat message to an existing topic in the chat message interface, which provides a chat message aggregation manner by using a topic as a center, and therefore, the user can view chat messages under the same topic conveniently.

Interaction Function

For any concatenated message under a topic, the user may perform at least one interaction of replying, replying with an emoji, liking, adding a file, and adding a file link.

Figure 8:
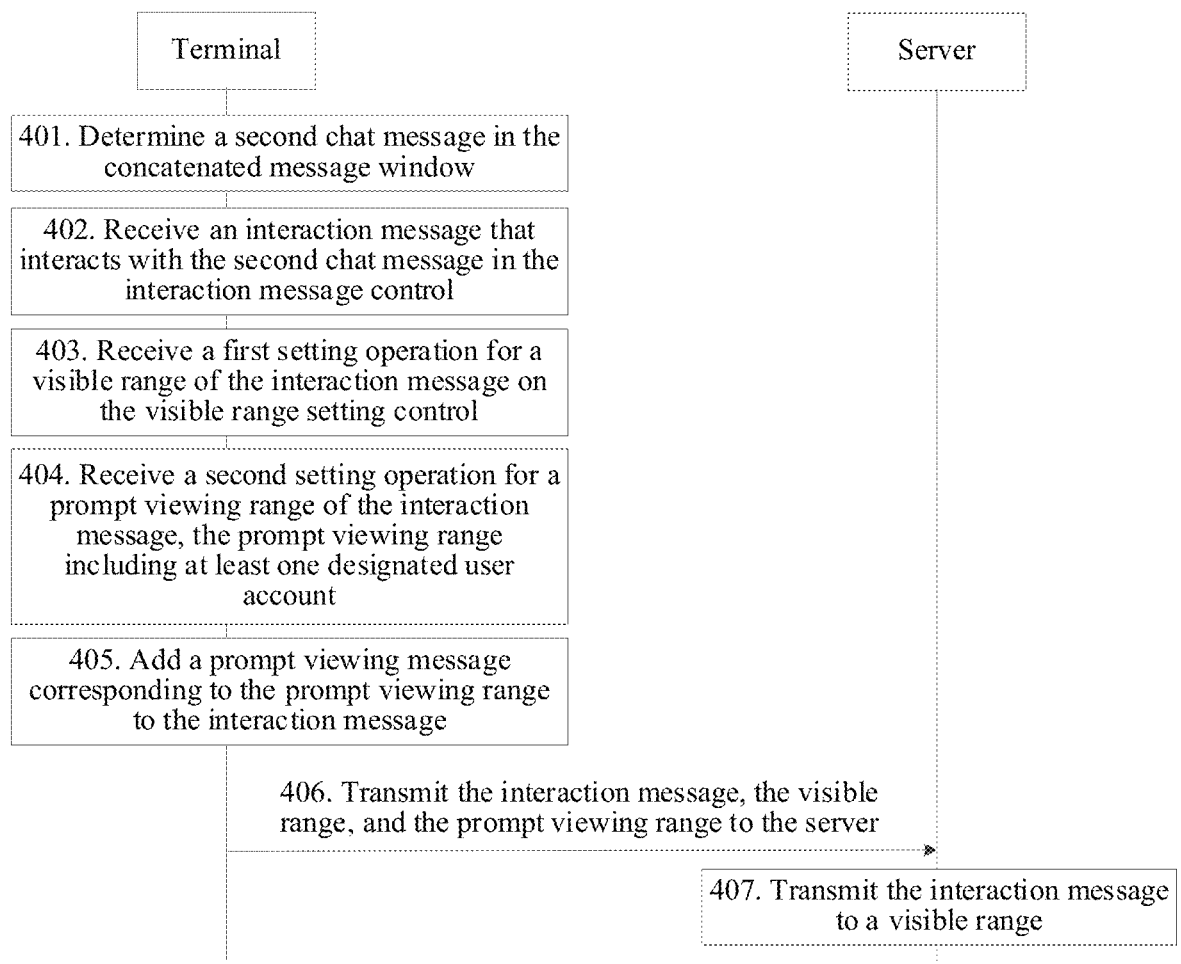
FIG. 8 is a flowchart of a chat message display method according to an embodiment of this disclosure.

For example, an interaction message control is displayed in the concatenated message window. The terminal determines a second chat message in the concatenated message window, receives an interaction message that interacts with the second chat message by using the interaction message control, and transmits the interaction message to the server. In an embodiment based on FIG. 2, the user may transmit the interaction message in different visible ranges. As shown in FIG. 8, the method cab include the following operations.

In step 401, the terminal determines a second chat message in the concatenated message window.

In some examples, a plurality of chat messages are displayed in the concatenated message window. The terminal determines a latest chat message under the topic as the second chat message by default, alternatively, determines a designated chat message as the second chat message according to a selection operation of the user. For example, the user may alternatively tap any chat message as the second chat message.

In some examples, as shown in FIG. 9, an interaction message control 343, a transmission button 344, visible range setting controls 3451 and 3452, a prompt viewing setting control 3453 are displayed in the concatenated message interface 34. The interaction message control 343 is configured to generate an interaction message. The transmission (or send) button 344 is configured to transmit the interaction message. The visible range setting controls 3451 and 3452 are configured to set a visible range of the interaction message.

In some examples, as shown in FIG. 9, the interaction message control 343 includes at least one of a text (and a link) input box 3431, an emoji input button 3432, a file addition button 3433, and a like button (not shown).

The visible range includes at least one of a topic to which the second chat message belongs, a second chat group to which the second chat message belongs, and a chat group other than the second chat group.

In step 402, the terminal receives an interaction message that interacts with the second chat message in the interaction message control.

The user inputs the interaction message in the interaction message control 343. The interaction message includes at least one type of message content of text, an emoji, a link, a file, a picture, and the like.

In step 403, the terminal receives a first setting operation for a visible range of the interaction message on the visible range setting control.

In this embodiment, a visible range of the interaction message by default is a concatenated message topic to which the second chat message belongs.

When the user also wants to transmit the interaction message to the second chat group, the visible range setting control 3451 is checked. The visible range setting control 3451 may be a check box of "also send to a current chat".

When the user also wants to transmit the interaction message to another chat, the visible range setting control 3452 is tapped. The visible range setting control 3452 may be a share button of "sharing to another chat". After the visible range setting control 3452 is tapped, the user may select one or more chats from existing chats as a visible range of the interaction message.

In step 404, the terminal receives a second setting operation for a prompt viewing range of the interaction message, the prompt viewing range including at least one designated user account.

The prompt viewing function is a function of A. In some examples, a prompt viewing control 3453 is further displayed in the concatenated message interface, and the prompt viewing control 3453 may be a button of "@ who". When the user taps the button of "@ who", one or more designated user accounts may be selected as a person or persons who are prompted to view the interaction message.

The user may directly input a symbol of "@" by using the text input box, to trigger the prompt viewing function.

In step 405, the terminal adds a prompt viewing message corresponding to the prompt viewing range to the interaction message.

The terminal adds a prompt viewing message of "@ a designated user account" in the interaction message according to the user's operation.

In step 406, the terminal transmits the interaction message, the visible range, and the prompt viewing range to the server.

When the transmission button is triggered, the terminal transmits the interaction message, the visible range, and the prompt viewing range to the server. The visible range and the prompt viewing range are optional. When the visible range is not included, a visible range by default is a current topic to which the second chat message belongs. When the prompt viewing range is not included, an enhanced prompt is not provided by default, and the interaction message is used as a normal message for transmission.

In some examples, the terminal transmits a message transmission request to the server, and the message transmission request includes at least one of a topic identifier of a topic to which the second chat message belongs, a message identifier of the second chat message, a message identifier of the interaction message, message content of the interaction message, an interaction type of the interaction message, an acquisition time of the interaction message, and a visible range of the interaction message. The interaction type includes at least one of a reply, a like, an emoji, and a file (e.g., a document).

In a schematic example, a client divides the message transmission request into two requests: an interaction message storage request and an interaction message notification request.

The client transmits an interaction message storage request to the message and interaction storage module 1422 in the server through an interface #topicID_msgID_fromChatID_replyID, the interaction message storage request carrying at least one of a topic identifier topicID of the topic to which the second chat message belongs, a message ID msgID of the second chat message, a source chat ID from ChatID of the second chat message, a message ID replyID of the interaction message, message content of the interaction message, a publisher ID of the interaction message, an interaction type of the interaction message, and an acquisition time of the interaction message. The message and interaction storage module 1422 is maintained with the data table according to the interaction message storage request, as shown in Table 3.

in Table 3 and Table 2 may be designed as a data table, or may be designed as two data tables having a common field, which is not limited herein.

The client transmits an interaction message notification request to the notification distribution module 1423 in the server through an interface #topicID_msgID_fromChatID_replyID_toChatID_toUserID. The interaction message notification request carries a message ID replyID and a visible range of an interaction message.

The notification distribution module 1423 in the server is maintained with the data table according to the interaction message storage request, as shown in Table 4.

TABLE 4

Storage list of visible range

| Interaction ID (replyID) | Notification chat (toChatID) | Chat name of notification chat | Person prompted to view (toUserID) | Name of person prompted to view | Notification time | Whether to notify (1. Yes, 0. No) |
|---|---|---|---|---|---|---|
| 135 | toChatID = 3333 | Interaction big group | toUserID = 256 | Doughnut | February 28 16:43 | 1 |

In some examples, the data tables shown in Table 4 and Table 3 may be designed as a data table, or may be designed as two data tables having a common field, which is not limited herein.

In some examples, the data tables shown in Table 4, Table 3, and Table 2 may be designed as a data table, or may be designed as two or three data tables having a common field, which is not limited herein.

In step 407, the server forwards the interaction message to the visible range.

The server forwards the interaction message. In some examples, the server forwards the interaction message to each user account of the topic to which the second chat message belongs. When the visible range includes the second chat group, the server further forwards the interaction message to a member user account of the second chat group. When the visible range includes another chat group, the server further forwards the interaction message to a member user account of the another chat group.

When the interaction message further includes the prompt viewing message, the server forwards the interaction message carrying the prompt viewing message. That is, the server transmits the interaction message carrying the prompt viewing message to the visible range.

According to the method provided in this embodiment, by providing a plurality of types of interaction messages, the

TABLE 3

Storage list of second chat messages and interaction messages

| Topic identifier (TopicID) | Message identifier (MsgID) | Interaction ID (replyID) | Message content | Acquisition time | Interaction publisher (userID) | Interaction type (reply, like, emoji, file, and the like) |
|---|---|---|---|---|---|---|
| 1111 | 123 | 135 | If a closed test is required, check UI first | February 28 16:43 | 333 | Reply |

In some examples, the second chat message is stored in the data table shown in Table 2, and the data tables shown user performs a plurality of interactions on any chat message (e.g., the second chat message) in the concatenated message.

According to the method provided in this embodiment, by providing manners of transmitting interaction messages of different visible ranges, the interaction message may reply in different communication sets in a user defined manner. Therefore, diversified reply manners are provided in a concatenated message interface, and the user does not need to transmit the same message repeatedly in different chats, and does not need to switch between different chat interfaces, thereby effectively improving the communication efficiency between the user and the IM client.

In an embodiment based on the foregoing embodiment, the terminal further displays a second chat message corresponding to the interaction message in a message region corresponding to the interaction message. That is, the second chat message and the interaction message are displayed as a concatenated message combination, so that the user can view the second chat message and the interaction message vividly without reviewing history message records, thereby saving the user's query operation.

Figure 10:
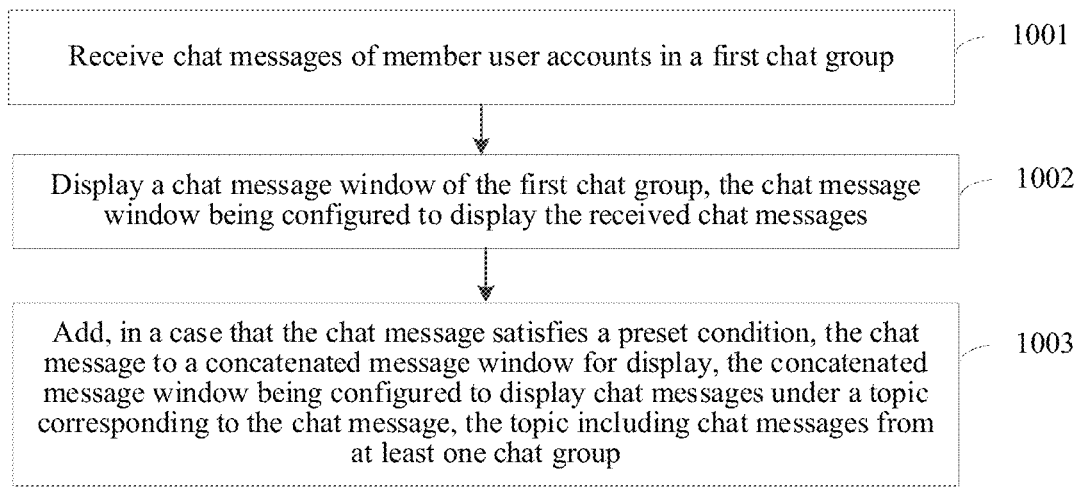
FIG. 10 is a flowchart of a chat message display method according to an embodiment of this disclosure.

In an embodiment based on the foregoing embodiment, the chat message may alternatively be automatically added to a topic by the server without a manual operation of the user. FIG. 10 is a flowchart of a chat message display method according to another embodiment of this disclosure. The method can include the following operations.

In step 1001, chat messages of member user accounts in a first chat group are received.

The first chat group includes two or more member user accounts, and each member user account may transmit a chat message in the first chat group.

In step 1002, a chat message window of the first chat group is displayed, the chat message window being configured to display the received chat messages.

An IM client used by any member user account in the first chat group may display the chat message window of the first chat group, and the chat message window is configured to display received chat messages corresponding to the member user accounts.

In step 1003, when the chat message satisfies a preset condition, the chat message is added to a concatenated message window for display. The concatenated message window is configured to display chat messages under a topic corresponding to the chat message, the topic including chat messages from at least one chat group.

In some embodiments, when a semantic distance between at least two chat messages is higher than a first threshold, the chat message is added to a new topic in the concatenated message window for display.

In some examples, the semantic distance is used for representing semantic distances between different chat messages, and a calculation manner of the semantic distance may be performed by the server or the terminal. When a semantic distance between at least two chat messages of the first chat group is relatively small, the chat messages are regarded to be under the same topic. The server or the terminal adds the at least two chat messages to the new topic for display.

In some examples, a topic name of the new topic may be inputted by the user manually, or may be generated by the server or the terminal automatically. For example, the server uses an extracted key word as the topic name of the new topic, alternatively, the server uses any chat message in the at least two chat messages as the topic name of the new topic. Alternatively, the topic name of the new topic is a default.

In some embodiments, when a semantic distance between the chat message and a target chat message is higher than a second threshold, the chat message is added to an existing topic in the concatenated message window for display, the target chat message being a chat message under the existing topic.

In some examples, if there is an existing topic, the server or the terminal may alternatively add the chat messages of the member user accounts in the first chat group to the existing topic automatically.

In some embodiments, the concatenated message window and the chat message window of the first chat are two windows or window regions independent of each other.

Figure 11:
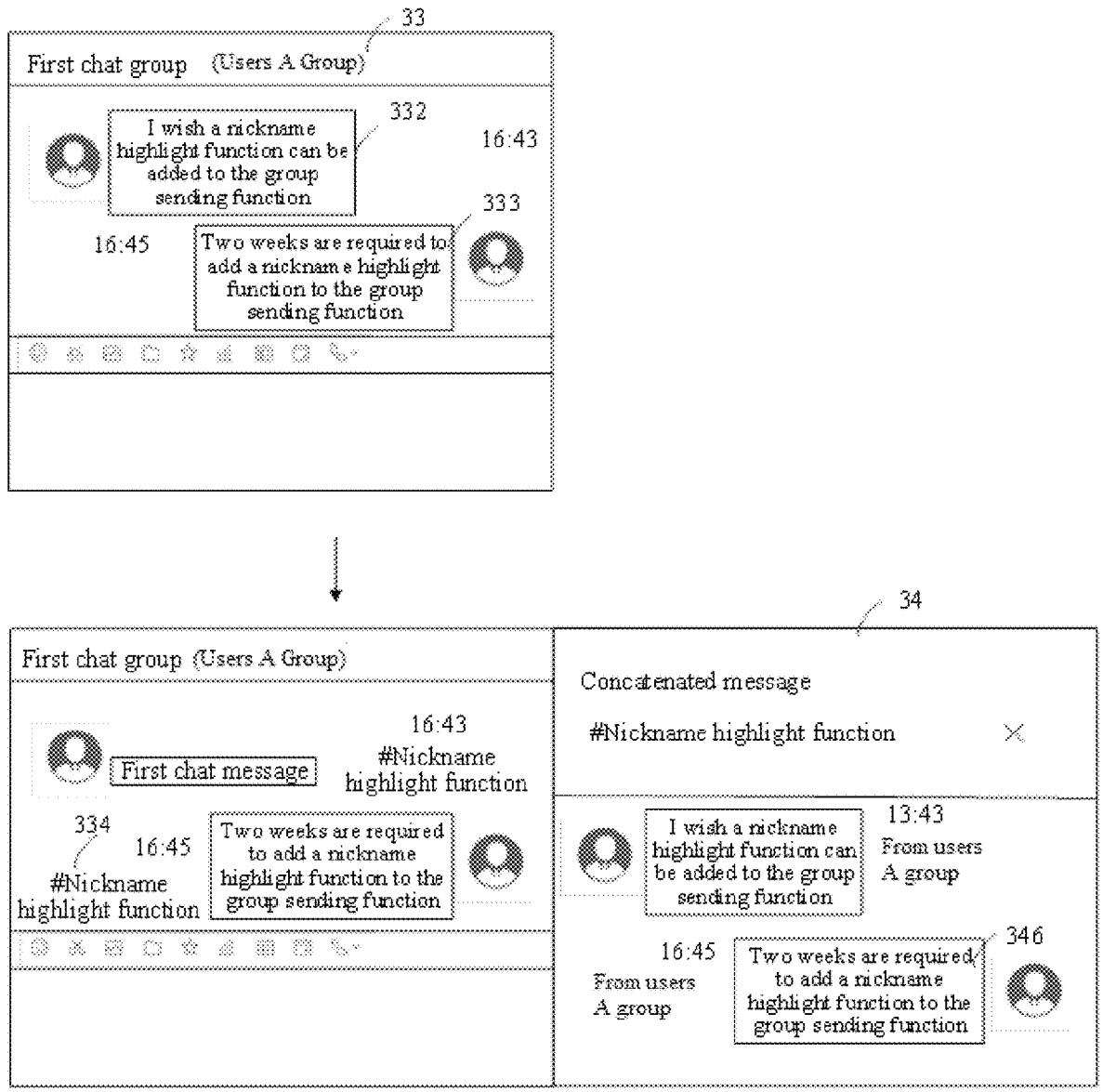
FIG. 11 is a schematic interface diagram of a concatenated message interface according to an embodiment of this disclosure.

For example, referring to FIG. 11, when two user accounts transmit a chat message "I wish a nickname highlight function can be added to the group sending function" 332 and a chat message "Two weeks are required to add a nickname highlight special effect to the group sending function" 333 in the first chat group, a semantic distance between the two chat messages are very close, and therefore, the terminal automatically extracts a concatenated message topic "nickname highlight function", and automatically adds the two chat messages to the topic for display. A topic name "nickname highlight function" of the topic is further added to be displayed in a region corresponding to the two chat messages in the first chat group, and the topic name is obtained according to key words of the two chat messages.

The foregoing preset condition may be set by an operation administrator of an IM program, or may be automatically set by a user locally, or may be set by a user at the cloud. When the IM program is a messaging program, the foregoing preset condition may be alternatively set by an administrator.

In some examples, the foregoing preset condition goes into effect with at least one of all chat groups, designated chat groups, designated groups, designated areas or departments, and designated user accounts. For example, the designated chat groups are several chat groups of areas or departments that have cross discussions, and the designated user accounts are user accounts of designated jobs. This is not limited in this embodiment of this disclosure.

In some embodiments, when the foregoing preset condition goes into effect with a chat group, the preset condition may go into effect with all chat messages in the chat group, or may go into effect with a part of chat messages. In a schematic example, the preset condition only goes into effect with a chat message having a designated key word match, and the designated key word may be set by an operation administrator of an IM program, or may be set by an administrator, or may be automatically set by a user. In another schematic example, the preset condition only goes into effect with a chat message that satisfies a designated semantic topic, and the designated semantic topic may be set by an operation administrator of an IM program, or may be set by an administrator, or may be automatically set by a user, or may be automatically generated according to semantics of the existing topic. This is not limited in this embodiment.

In some other embodiments, semantic topics of the existing chat messages may alternatively be accumulated, and when a quantity of chat messages under a semantic topic reaches a preset threshold, the semantic topic is set as a designated semantic topic, and the foregoing preset condition is enabled on chat messages satisfying the designated semantic topic.

According to the method provided in this embodiment, by automatically creating a topic according to a chat message in a first chat group or automatically adding the chat message to an existing topic, the user can perform concatenation viewing on chat messages under the same topic by using a concatenated message window without manual operation, thereby effectively improving the communication efficiency between the user and an IM client.

Figure 12:
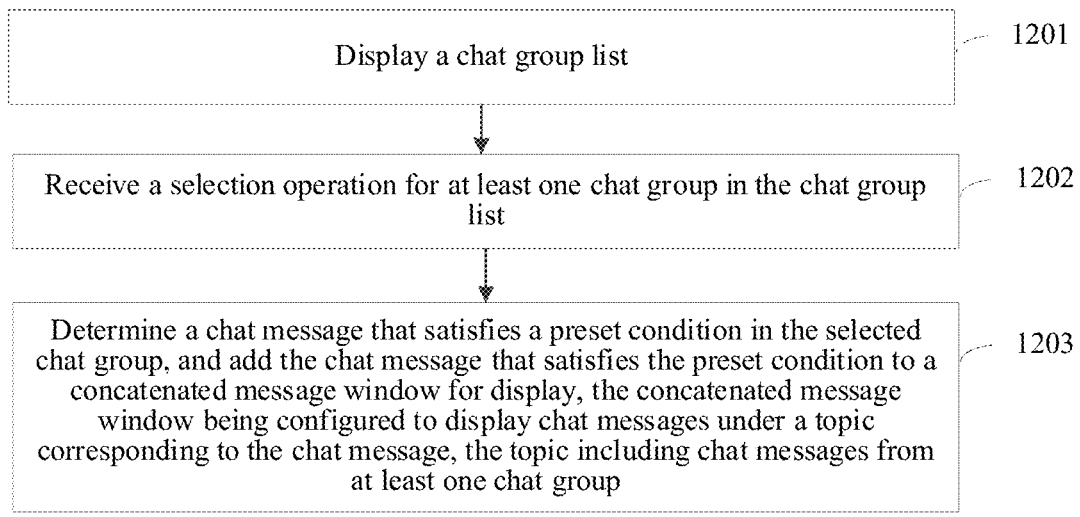
FIG. 12 is a flowchart of a chat message display method according to an embodiment of this disclosure.

In an embodiment based on the foregoing embodiment, the user may manually select a plurality of chat groups, and then the server performs concatenation on chat messages in these chat groups to obtain one or more topics. FIG. 12 is a flowchart of a chat message display method according to an exemplary embodiment of this disclosure. The method may be applied to the terminal shown in FIG. 1. The method can include the following operations.

In step 1201, a chat group list is displayed.

A chat group list exists in an IM program of any user account. One or more chat groups are displayed in the chat group list.

In step 1202, a selection operation is received for at least one chat group in the chat group list.

In step 1203, a chat message that satisfies a preset condition in the selected chat group is determined, and the chat message that satisfies the preset condition is added to a concatenated message window for display, the concatenated message window being configured to display chat messages under a topic corresponding to the chat message, the topic including chat messages from at least one chat group.

In some embodiments, when a semantic distance between at least two chat messages in a selected chat group is higher than a third threshold, the chat message is added to a new topic in the concatenated message window for display.

In some examples, the semantic distance is used for representing distances between different chat messages in semantics, and a calculation manner of the semantic distance may be performed by the server or the terminal. When a semantic distance between at least two chat messages in a selected chat group is relatively small, the chat messages are regarded to be under the same topic. The server or the terminal adds the at least two chat messages to the new topic for display.

In some examples, a topic name of the new topic may be inputted by the user manually, or may be generated by the server or the terminal automatically. For example, the server uses an extracted key word as the topic name of the new topic, alternatively, the server uses any chat message in the at least two chat messages as the topic name of the new topic. Alternatively, the topic name of the new topic is a default.

In some embodiments, when a semantic distance between the chat message and a target chat message in a selected chat group is higher than a second threshold, the chat message is added to an existing topic in the concatenated message window for display. The target chat message is a chat message under the existing topic.

In some embodiments, if there is an existing topic, the server or the terminal may alternatively add chat messages of member user accounts in a selected chat group to the existing topic automatically.

In some embodiments, the concatenated message window and the chat message window of the first chat are two windows or window regions independent of each other.

Figure 13:
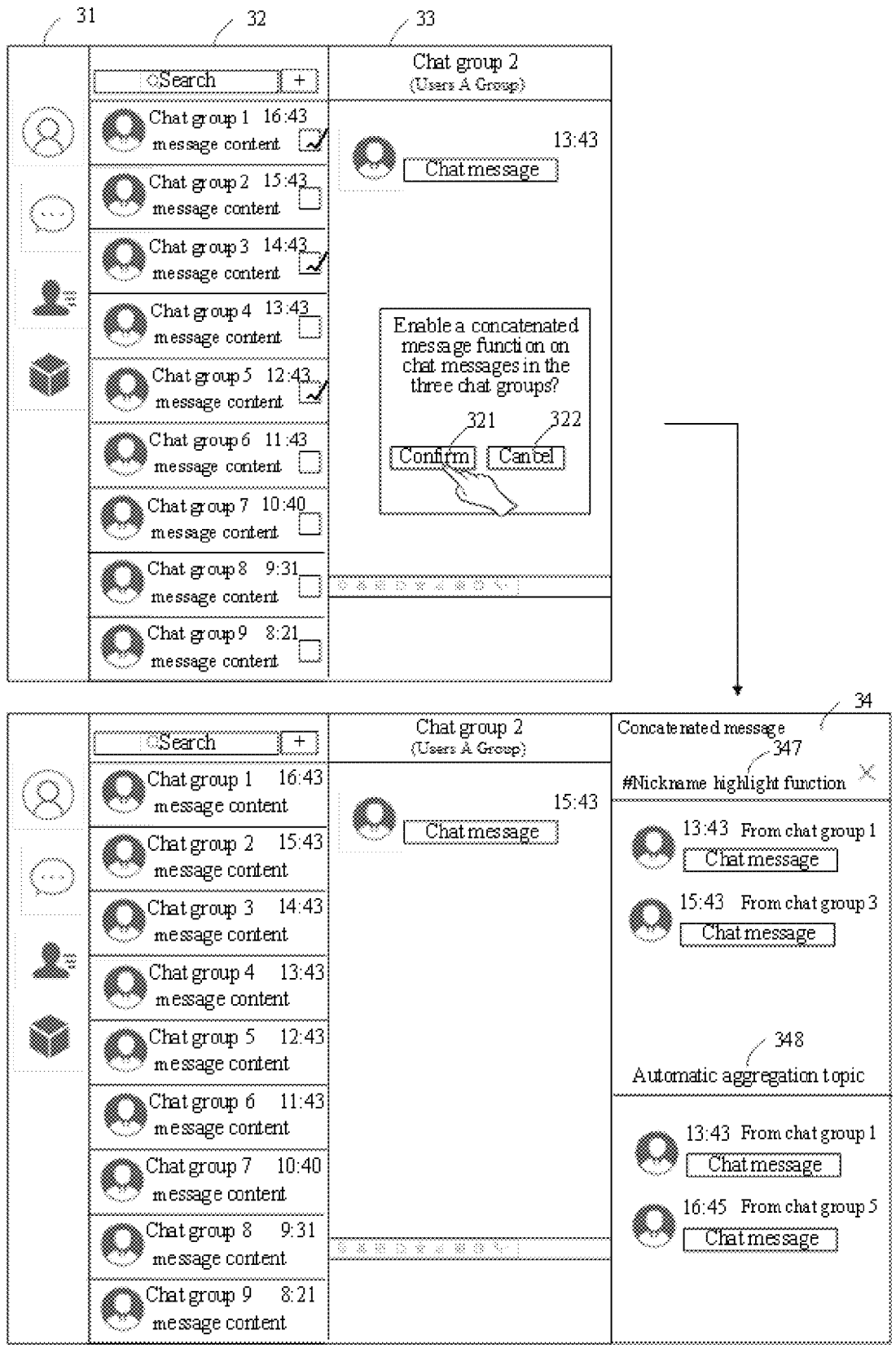
FIG. 13 is a schematic interface diagram of a concatenated message interface according to an embodiment of this disclosure.

For example, referring to FIG. 13, when the user checks a chat group 1, a chat group 3, and a chat group 5 in the chat group list 32, a dialog box "enabling a concatenated message function on chat messages in the three chat groups" pops up. A confirm button 321 and a cancel button 322 are further displayed in the dialog box. When the user taps the confirm button 321, the server performs automatic concatenation on chat messages in the three chat groups. After obtaining two topics through concatenation, a first topic has a clear key word "nickname highlight function", and therefore, a topic name of the first topic is determined as a "nickname highlight function" 347. Two latest chat messages are displayed at the same time, which are respectively from the chat group 1 and the chat group 3. A second topic does not have a clear key word, and therefore, a topic name of the second topic is determined as an "automatic aggregation topic" 348 by default. Two latest chat messages are displayed at the same time, which are respectively from the chat group 1 and the chat group 5.

The foregoing preset condition may be set by an operation administrator of an IM program, or may be automatically set by a user locally, or may be set by a user at the cloud. When the IM program is an messaging program, the foregoing preset condition may be alternatively set by an administrator.

In some embodiments, the preset condition may go into effect with all chat messages in a selected chat group, or may go into effect with a part of chat messages in a selected chat group. In an example, the preset condition only goes into effect with a chat message having a designated key word match, and the designated key word may be set by an operation administrator of an IM program, may be set by an administrator, or may be automatically set by a user. In another example, the preset condition only goes into effect with a chat message that satisfies a designated semantic topic, and the designated semantic topic may be set by an operation administrator of an IM program, may be set by an administrator, may be automatically set by a user, or may be automatically generated according to semantics of the existing topic. This is not limited in this embodiment.

In some other embodiments, semantic topics of the existing chat messages may alternatively be accumulated, and when a quantity of chat messages under a semantic topic reaches a preset threshold, the semantic topic is set as a designated semantic topic, and the foregoing preset condition is enabled on chat messages satisfying the designated semantic topic.

According to the method provided in this embodiment, by automatically creating a topic according to a chat message in a selected chat group or automatically adding the chat message to an existing topic, the user can perform concatenation viewing on chat messages under the same topic by using a concatenated message window without manual operation, thereby effectively improving the communication efficiency between the user and an IM client.

Figure 14:
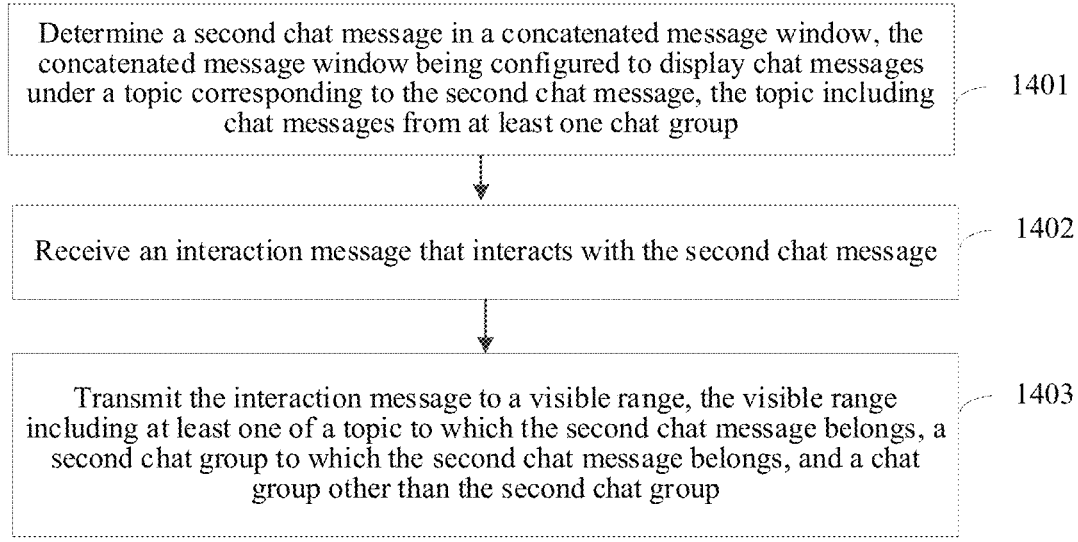
FIG. 14 is a flowchart of a chat message display method according to an embodiment of this disclosure.

FIG. 14 is a flowchart of a chat message display method according to another embodiment of this disclosure. The method may be applied to the terminal shown in FIG. 1. The method can include the following operations.

In step 1401, a second chat message in a concatenated message window is determined, the concatenated message window being configured to display chat messages under a topic corresponding to the second chat message, the topic including chat messages from at least one chat group.

In step 1402, an interaction message that interacts with the second chat message is received.

In step 1403, the interaction message is transmitted to a visible range, the visible range including at least one of a topic to which the second chat message belongs, a second chat group to which the second chat message belongs, and a chat group other than the second chat group.

In some embodiments, the visible range is determined by default of a system, or is manually configured by the user in advance.

In some embodiments, a visible range setting control is displayed in the concatenated message window. Further, the transmitting the interaction message to a visible range includes receiving a first setting operation for a visible range of the interaction message on the visible range setting control, the visible range including at least one of a topic to which the second chat message belongs, a second chat group to which the second chat message belongs, and a chat group other than the second chat group. The transmitting the interaction message to the visible range further includes transmitting the interaction message and the visible range to a server, the server being configured to forward the interaction message to user accounts within the visible range.

In some embodiments, the terminal receives a second setting operation for a prompt viewing range of the interaction message, the prompt viewing range including at least one designated user account. The terminal adds a prompt viewing message corresponding to the prompt viewing range to the interaction message.

Figure 15:
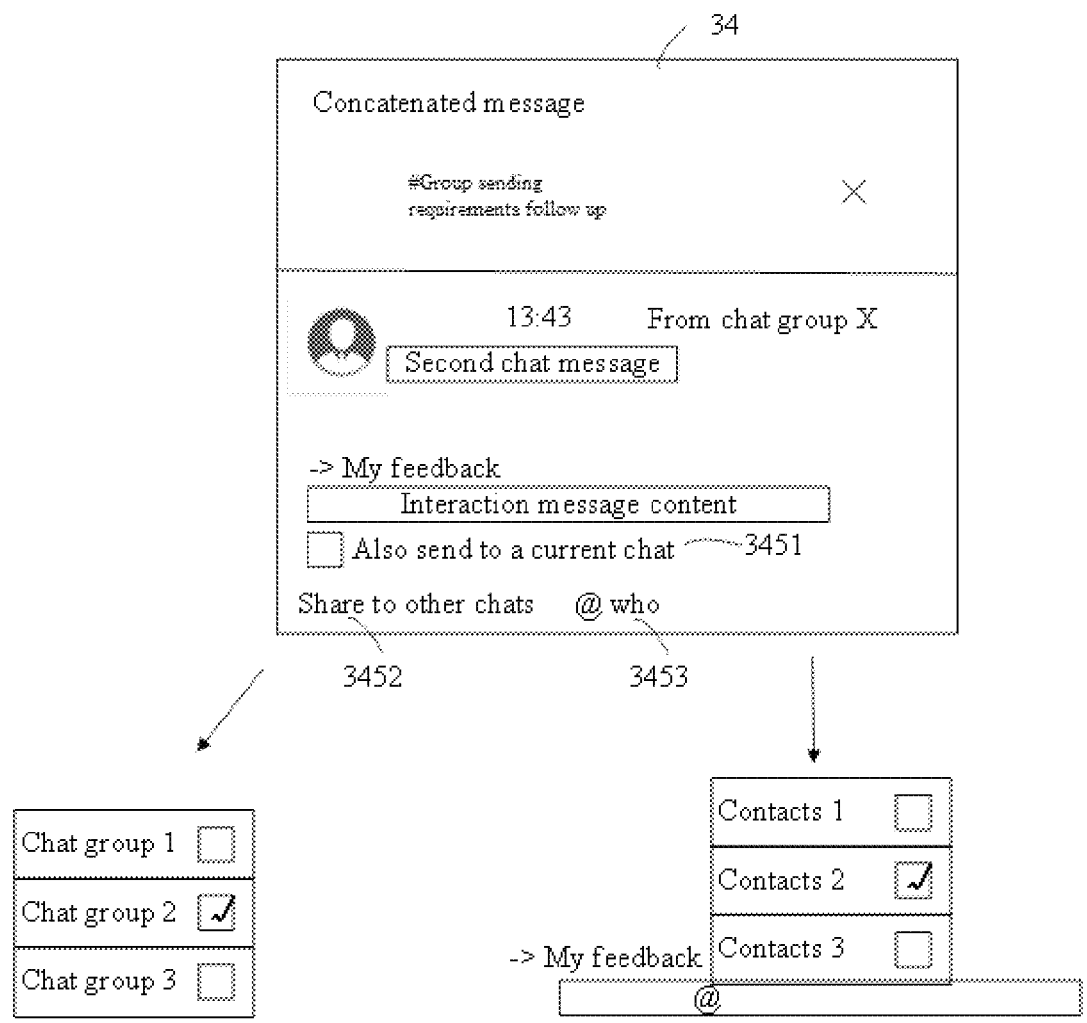
FIG. 15 is a schematic interface diagram of a concatenated message interface according to an embodiment of this disclosure.

For example, referring to FIG. 15, visible range setting controls 3451 and 3452, and a prompt viewing range setting control 3453 are displayed in the concatenated message interface 34. When the visible range setting control 3451 is checked, currently-replied interaction message content is transmitted to a chat group X. When the visible range setting control 3452 is tapped, a chat group check window pops up, and the user selects another chat group that the user wants to share with in the chat group check window. In some examples, when the user slides up and down the chat group check window, all chat groups can be viewed. When the prompt viewing range setting control 3453 is tapped, a contacts check window is displayed, and the user selects another contact that the user wants to prompt (@) to view in the contacts check window. In some examples, when the user slides up and down the contacts check window, all contacts can be viewed.

According to the method provided in this embodiment, by providing manners of transmitting interaction messages of different visible ranges, the interaction message may reply in different communication sets in a user defined manner. Therefore, diversified reply manners are provided in a concatenated message interface, and the user does not need to transmit the same message repeatedly in different chats, and does not need to switch between different chat interfaces, thereby effectively improving the communication efficiency between the user and the IM client.

Figure 16:
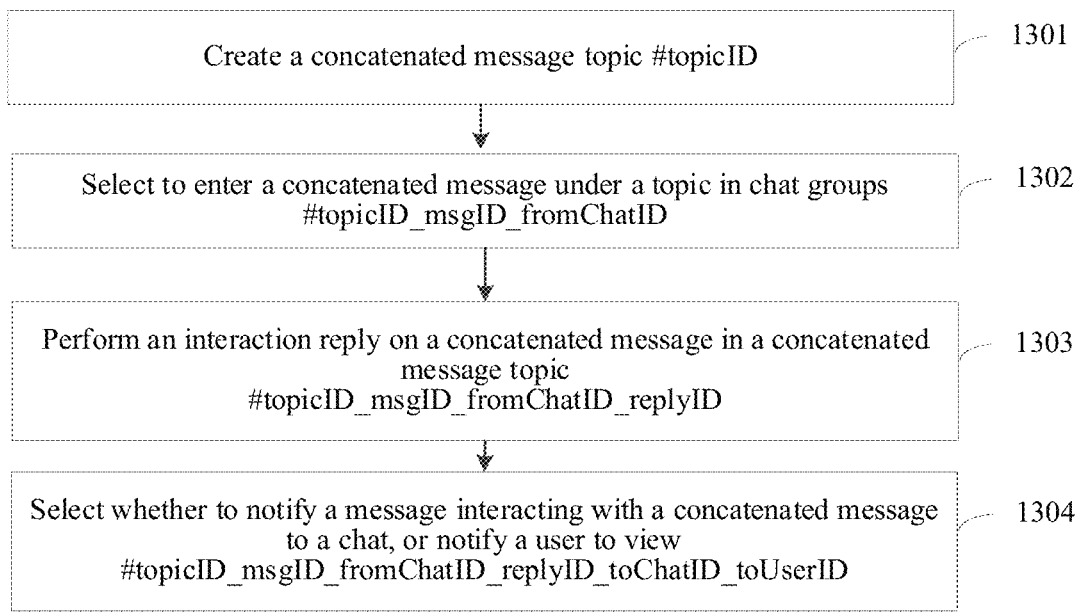
FIG. 16 is a flowchart of a chat message display method according to an embodiment of this disclosure.

An example in which the client run on the terminal is a messaging client is used. As shown in FIG. 16, the method can include the following operations.

In step 1301, a concatenated message topic is created.

A client runs on the terminal, and the client may be a messaging client. The client receives a user's operation, and the client creates a concatenated message topic according to the user's operation, and transmits a data request of this creation to the server. The client may communicate with the server through an interface #topic ID.

A topic storage module in the server performs a creation process of the concatenated message topic according to the request.

The topic storage module in the server is maintained with a data table, as shown in Table 1.

The server updates content of the concatenated message topic to Table 1 according to the request received through the interface #topic ID.

In step 1302, a selection is made to enter a concatenated message under a topic in chats.

The user operates on the client, and may select to enter a concatenated message under a topic in chats. The client acquires messages in the chats to a concatenated topic, and transmits a data request of this acquisition to the server. The client may perform interaction communication with concatenated message content, source, and an interaction storage module in the server through an interface #topicID_msgID_fromChatID.

The interaction storage module in the server is maintained with a data table, as shown in Table 2.

The server updates data on which communication update is performed through the interface #topicID_msgID_fromChatID to Table 2.

In step 1303, an interaction reply on a concatenated message is performed in the concatenated message topic. #topicID_msgID_fromChatID_replyID.

The user operates on the client, and may select to perform an interaction reply and another interaction on a concatenated message from a list of a concatenated message topic. The client acquires behavior data and message content obtained by interacting with a concatenated message to a responding concatenated message topic, and transmits a data request of this interaction to the server. The client may perform interaction communication with concatenated message content, source, and an interaction storage module in the server through an interface #topicID_msgID_fromChatID_replyID.

The interaction storage module in the server is maintained with a data table, as shown in Table 3. The server updates data on which communication update is performed through the interface #topicID_msgID_fromChatID_replyID to Table 3.

In step 1304, notification of an interaction message is performed.

The user operates on the client, and selects whether to notify an interaction message interacting with a concatenated message to a chat and prompt (@) some designated user accounts to view.

The client transmits notification data to the server, and performs interaction communication with a notification distribution module in the server. The client communicates through an interface #topicID_msgID_fromChatID_replyID_toChatID_toUserID.

The notification distribution module in the server is maintained with a data table, as shown in Table 4. The server updates data on which communication update is performed through the interface #topicID_msgID_fromChatID_replyID_toChatID_toUserID to Table 4.

Figure 17:
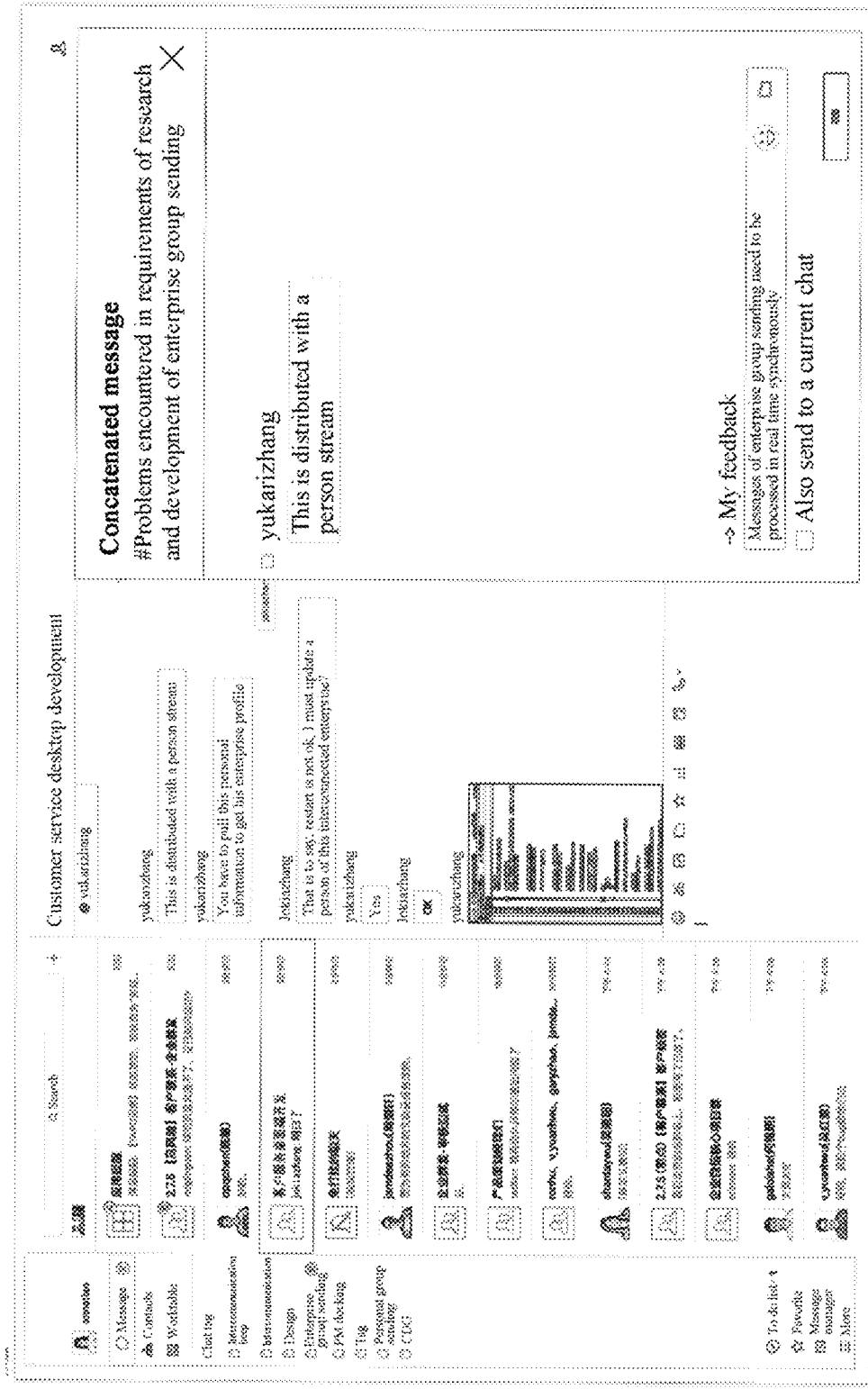
FIG. 17 is a schematic interface diagram of a concatenated message interface according to an embodiment of this disclosure.

The visible range setting controls 3451 and 3452, and the prompt viewing control 3453 shown in FIG. 9 are exemplary controls. In some embodiments, at least one control in the visible range setting control 3451, the visible range setting control 3452, and the prompt viewing control 3453 may not be set. As shown in FIG. 17, a concatenated message interface is not provided with the visible range setting control 3452 and the prompt viewing control 3453.

Figure 18:
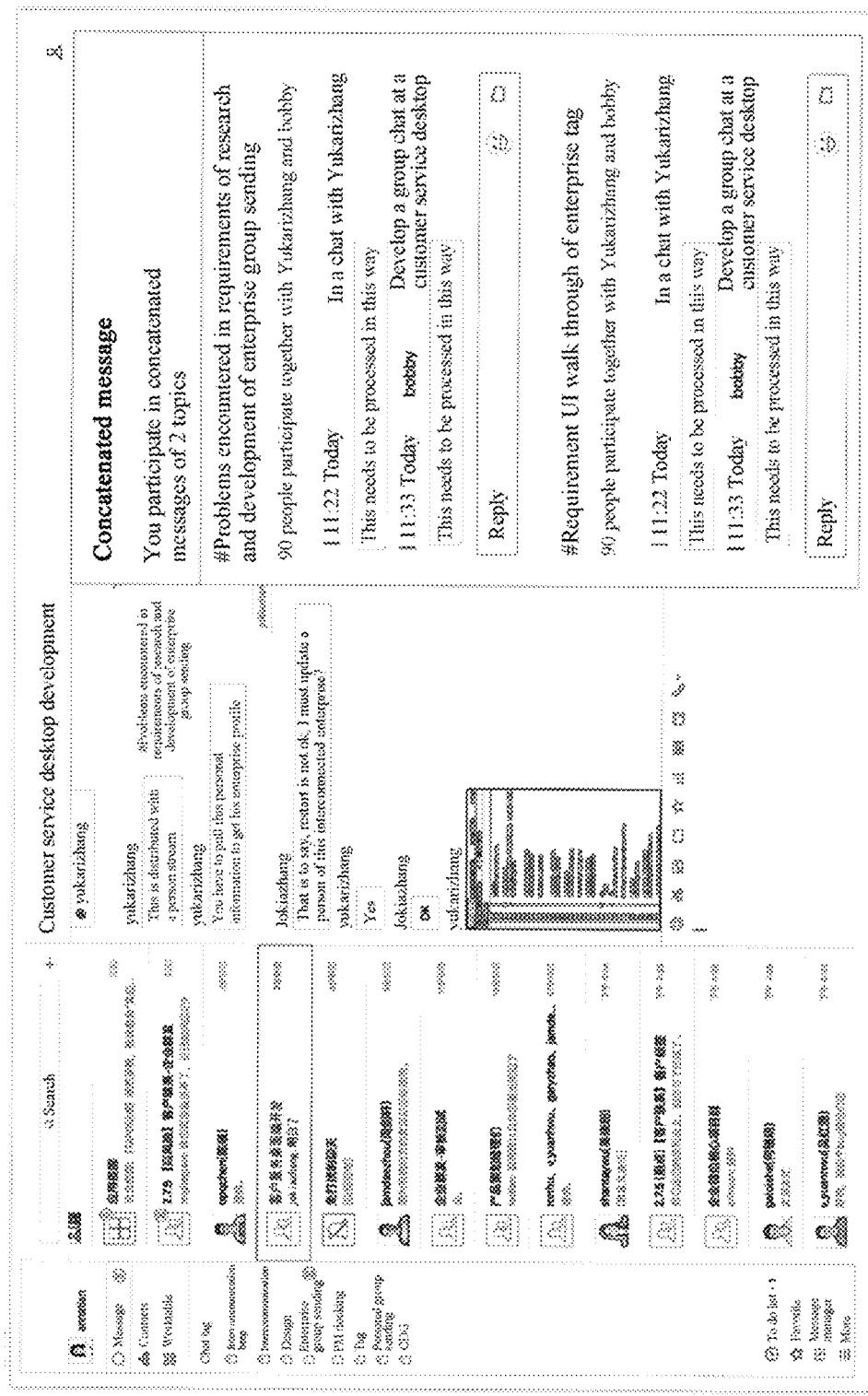
FIG. 18 is a schematic interface diagram of a concatenated message interface according to an embodiment of this disclosure.

Because the user may participate in discussions of two or more topics at the same time, a concatenated message interface includes at least two regions, and each region is configured to display chat messages of a single existing topic. As shown in FIG. 18, the user participates in two topics "#Problems encountered in requirements of research and development of group sending" and "#Requirement UI walk through of tag" at the same time. An upper region in the concatenated message window is configured to display the latest two chat messages and corresponding interaction message controls of the topic "#Problems encountered in requirements of research and development of group sending". A lower region in the concatenated message window is configured to display the latest two chat messages and corresponding interaction message controls of the topic "#Requirement UI walk through of tag".

User accounts and nicknames in the accompanying drawings are all for illustration purposes only, and are not intended to refer to contacts in the real world.

The following describes apparatus embodiments of this disclosure, which can be used for executing the method embodiments of this disclosure. For details not disclosed in the apparatus embodiments of this disclosure, refer to the method embodiments of this disclose. One or more of the apparatus embodiments can be implemented by processing circuitry (e.g., a processor), software, or a combination thereof, for example.

Figures 19, 20:
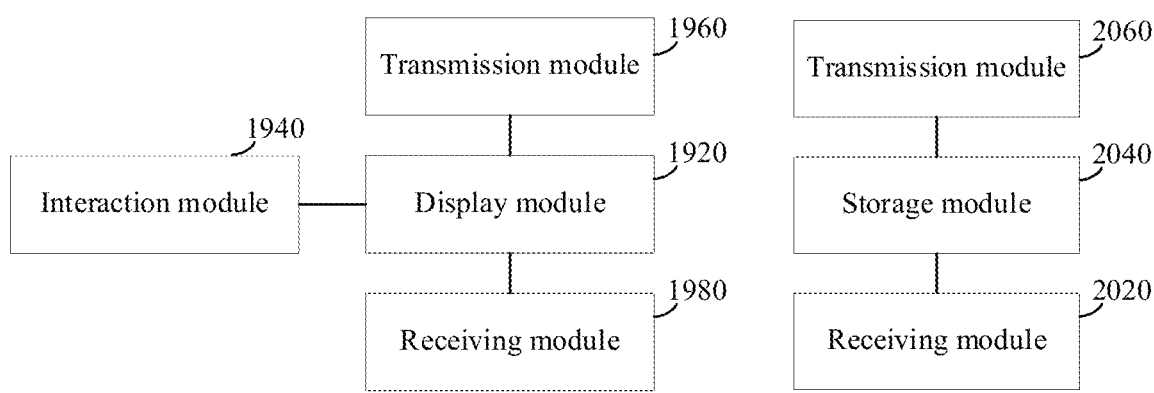
FIG. 19 is a block diagram of a chat message display apparatus according to an embodiment of this disclosure.
FIG. 20 is a block diagram of a chat message display apparatus according to an embodiment of this disclosure.

FIG. 19 is a block diagram of a chat message display apparatus according to an exemplary embodiment of this disclosure. The apparatus may be implemented as a part of a terminal by using software or hardware, and a client having an IM function is run on the terminal. The apparatus can include a display module 1920 and an interaction module 1940. One or more modules of the apparatus can be implemented by processing circuitry, software, or a combination thereof, for example.

The display module 1920 is configured to display a chat message window of a first chat group, the chat message window being configured to display received chat messages between member user accounts. The interaction module 1940 is configured to receive a trigger operation triggered for a first chat message in the chat message window. The display module 1920 is further configured to display the first chat message in a concatenated message window according to the trigger operation, the concatenated message window being configured to display chat messages under a topic corresponding to the first chat message, the topic including chat messages from at least one chat group.

In some embodiments, the trigger operation is a topic creation operation. The display module 1920 is configured to display the concatenated message window according to the topic creation operation, the first chat message being displayed under a new topic in the concatenated message window.

In some embodiments, the interaction module 1940 is configured to receive a topic name editing operation at the concatenated message window. The display module 1940 is configured to display a topic name of the new topic in the concatenated message window according to the topic name editing operation.

In some embodiments, the apparatus further includes a transmission module 1960 and a receiving module 1980.

The transmission module 1960 is configured to transmit a topic creation request to a server, the topic creation request carrying the topic name.

The receiving module 1980 is configured to receive a topic identifier of the new topic fed back by the server.

The display module 1920 is configured to transmit a first message addition request to the server according to the topic identifier, the first message addition request being used for requesting to store a correspondence between the first chat message and the topic name.

In some embodiments, the trigger operation is a message addition operation for adding the first chat message to an existing topic.

The display module 1920 is configured to display the concatenated message window according to the message addition operation, the first chat message being displayed under the existing topic in the concatenated message window.

In some embodiments, the apparatus further includes the receiving module 1980.

The receiving module 1980 is configured to receive a topic name selection operation at the concatenated message window. The interaction module 1940 is configured to determine a target topic name from topic names of at least one existing topic according to the topic name selection operation, the existing topic including a concatenated message topic created in other chat groups. The display module 1920 is configured to display the target topic name in the concatenated message window.

In some embodiments, the apparatus further includes the transmission module 1960.

The transmission module 1960 is configured to transmit a second message addition request to a server, the second message addition request being used for requesting to store a correspondence between the first chat message and the target topic name.

In some embodiments, the first chat message is a chat message that has been added to the topic, the topic being displayed in a message region corresponding to the first chat message in the chat message window.

The interaction module 1940 is configured to receive a topic viewing operation triggered for the topic in the message region. The display module 1920 is configured to display the concatenated message window according to the topic viewing operation.

In some embodiments, the concatenated message window and the chat message window are two windows or window regions side by side.

In some embodiments, a chat name of the first chat is displayed in a message region corresponding to the first chat message in the concatenated message window.

In some embodiments, an interaction message control is displayed in the concatenated message window. The apparatus can further include the interaction module 1940 and the receiving module 1980.

The interaction module 1940 is configured to determine a second chat message in the concatenated message window. The receiving module 1980 is configured to receive an interaction message that interacts with the second chat message by using the interaction message control, the interaction message including at least one of text, an emoji, a file, a link, and a like; and the transmission module 1960, configured to transmit the interaction message.

In some embodiments, a visible range setting control is further displayed in the concatenated message window.

The receiving module 1980 is configured to receive a first setting operation for a visible range of the interaction message on the visible range setting control, the visible range including at least one of a topic to which the second chat message belongs, a second chat group to which the second chat message belongs, and a chat group other than the second chat group. The transmission module 1960 is configured to transmit the interaction message and the visible range to the server.

In some embodiments, the receiving module 1980 is configured to receive a second setting operation for a prompt viewing range of the interaction message, the prompt viewing range including at least one designated user account. The display module 1920 is configured to add a prompt viewing message corresponding to the prompt viewing range to the interaction message.

In some embodiments, the concatenated message window includes at least two regions, each region being configured to display chat messages under a single existing topic.

In an exemplary embodiment based on FIG. 19, the interaction module 1940 is configured to receive chat messages of member user accounts in a first chat group.

The display module 1920 is configured to display a chat message window of the first chat group, the chat message window being configured to display the received chat messages.

The display module 1920 is further configured to add, when the chat message satisfies a preset condition, the chat message to a concatenated message window for display, the concatenated message window being configured to display chat messages under a topic corresponding to the chat message, the topic including chat messages from at least one chat group.

In some embodiments, the display module 1920 is configured to add, when a semantic distance between the at least two chat messages is higher than a first threshold, the chat message to a new topic in the concatenated message window for display.

In some embodiments, the display module 1920 is configured to add, when a semantic distance between the chat message and a target chat message is higher than a second threshold, the chat message to an existing topic in the concatenated message window for display, the target chat message being a chat message under the existing topic.

In some embodiments, the concatenated message window and the chat message window of the first chat are two windows or window regions independent of each other.

In an exemplary embodiment based on FIG. 19, the display module 1920 is configured to display a chat group list.

The receiving module 1980 is configured to receive a selection operation for at least one chat group in the chat group list.

The display module 1920 is further configured to determine a chat message that satisfies a preset condition in the selected chat group, and add the chat message that satisfies the preset condition to a concatenated message window for display, the concatenated message window being configured to display chat messages under a topic corresponding to the chat message, the topic including chat messages from at least one chat group.

In some embodiments, the display module 1920 is configured to add, when a semantic distance between the at least two chat messages in the selected chat group is higher than a third threshold, the chat message to a new topic in the concatenated message window for display.

In some embodiments, the display module 1920 is configured to add, when a semantic distance between the chat message and a target chat message in the selected chat group is higher than a second threshold, the chat message to an existing topic in the concatenated message window for display, the target chat message being a chat message under the existing topic.

In some embodiments, the concatenated message window and the chat message window of the first chat are two windows or window regions independent of each other.

In an exemplary embodiment based on FIG. 19, the interaction module 1940 is configured to determine a second chat message in a concatenated message window, the concatenated message window being configured to display chat messages under a topic corresponding to the second chat message, the topic including chat messages from at least one chat group.

The interaction module 1940 is further configured to receive an interaction message that interacts with the second chat message.

The transmission module 1960 is configured to transmit the interaction message to a visible range, the visible range including at least one of a topic to which the second chat message belongs, a second chat group to which the second chat message belongs, and a chat group other than the second chat group.

In some embodiments, a visible range setting control is displayed in the concatenated message window.

The interaction module 1940 is further configured to receive a first setting operation for a visible range of the interaction message on the visible range setting control, the visible range including at least one of a topic to which the second chat message belongs, a second chat group to which the second chat message belongs, and a chat group other than the second chat group. The transmission module 1960 is configured to transmit the interaction message and the visible range to a server, the server being configured to forward the interaction message to user accounts within the visible range.

In some embodiments, the interaction module 1940 is further configured to receive a second setting operation for a prompt viewing range of the interaction message, the prompt viewing range including at least one designated user account; and add a prompt viewing message corresponding to the prompt viewing range to the interaction message.

FIG. 20 is a block diagram of a chat message display apparatus according to an exemplary embodiment of this disclosure. The apparatus may be implemented as a part of a server by using software or hardware. The apparatus can includes a receiving module 2020, a storage module 2040, and a transmission module 2060. One or more modules of the apparatus can be implemented by processing circuitry and/or memory, software, or a combination thereof, for example.

The receiving module 2020 is configured to receive a topic creation request transmitted by a terminal, the topic creation request being transmitted by the terminal after a topic creation operation triggered for a first chat message in a chat message window is received, the chat message window being configured to display received chat messages between member user accounts of the first chat group.

The storage module 2040 is configured to allocate a topic identifier of a new topic according to a topic name in the topic creation request.

The transmission module 2060 is configured to transmit the topic identifier to the terminal, the terminal being configured to display a concatenated message window according to the topic identifier, the concatenated message window being configured to display chat messages under a topic to which the first chat message belongs, the topic including chat messages from at least one chat group.

In some embodiments, the receiving module 2020 is configured to receive a first message addition request transmitted by the terminal. The storage module 2040 is configured to store a correspondence between the first chat message and the topic name according to the first message addition request.

In some embodiments, the receiving module 2020 is configured to receive a second message addition request transmitted by the terminal, the second message addition request being transmitted after the terminal determines a target topic name from topic names of at least one existing topic according to a topic name selection operation, the existing topic including a concatenated message topic created in other chat groups. The storage module 2040 is configured to store a correspondence between the first chat message and the target topic name according to the second message addition request.

In some embodiments, the new topic includes a second chat message.

The receiving module 2020 is configured to receive an interaction message of the second chat message transmitted by the terminal, the interaction message including at least one of text, an emoji, a file, a link, and the like. The transmission module 2060 is configured to forward the interaction message.

In some embodiments, the receiving module 2020 is configured to receive a visible range of the interaction message transmitted by the terminal, the visible range including at least one of a topic to which the second chat message belongs, a second chat group to which the second chat message belongs, and a chat group other than the second chat group. The transmission module 2060 is configured to forward the interaction message to the visible range.

In some embodiments, the transmission module 2060 is configured to forward the interaction message carrying a prompt viewing message The foregoing division of the functional modules is merely used as an example for description when the chat message display apparatus provided in the foregoing embodiments displays a chat message in a concatenated message window. In practical application, the foregoing functions may be allocated to and completed by different functional modules according to requirements, that is, an inner structure of a device is divided into different functional modules to implement all or a part of the functions described above. In addition, the chat message display apparatus provided by the foregoing embodiments are based on the similar concept as the chat message display method in the foregoing embodiments. For an exemplary implementation process, refer to the method embodiments, and the details are not described herein again.

Figure 21:
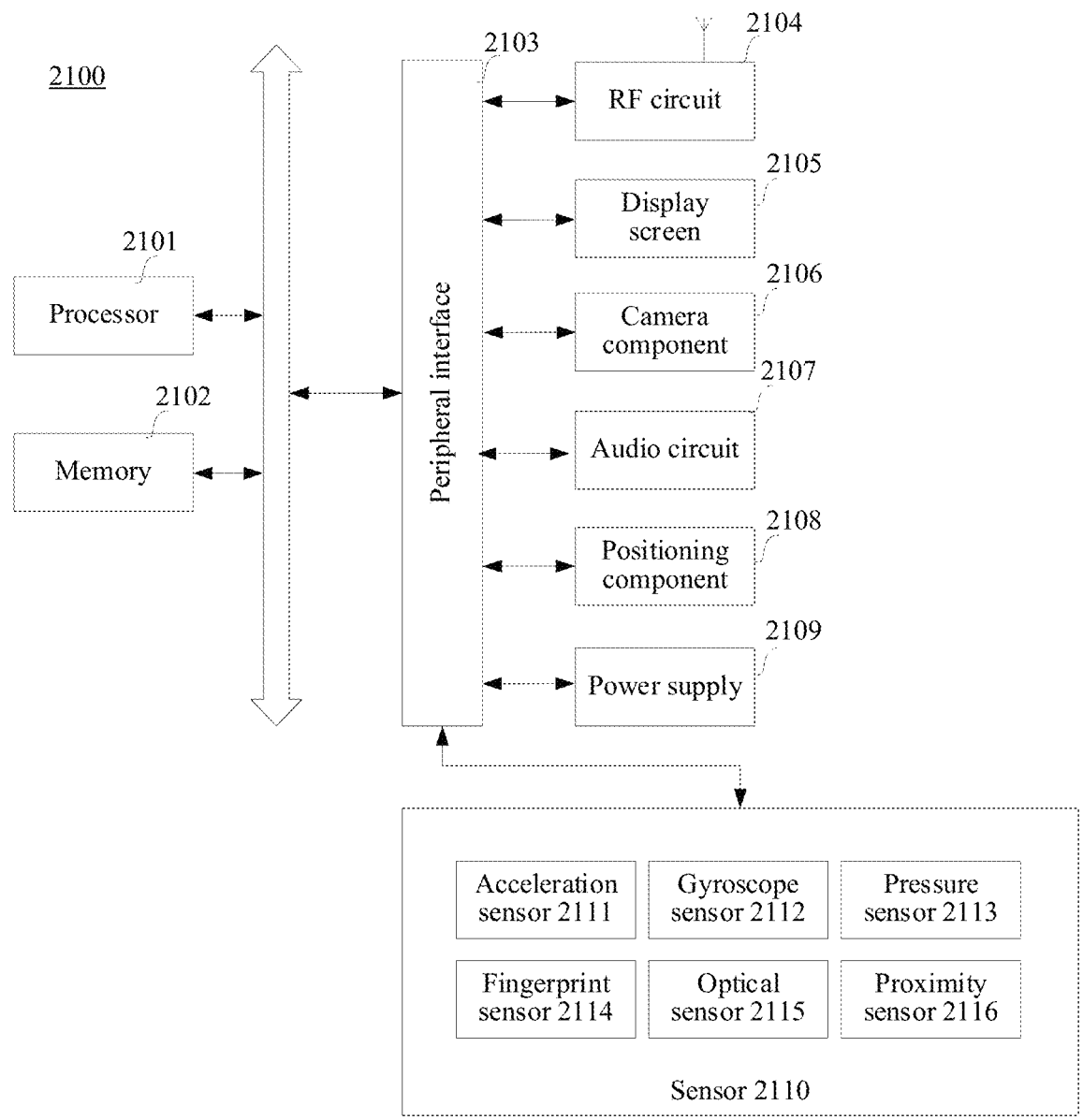
FIG. 21 is a block diagram of a terminal according to an embodiment of this disclosure.

FIG. 21 is a structural block diagram of a terminal 2100 according to an exemplary embodiment of this disclosure. The terminal 2100 may be a smartphone, a tablet computer, a Moving Picture Experts Group Audio Layer III (MP3) player, a Moving Picture Experts Group Audio Layer IV (MP4) player, a notebook computer, or a desktop computer. The terminal 2100 may be also referred to as a user equipment, a portable terminal, a laptop terminal, a desktop terminal or the like.

Generally, the terminal 2100 includes processing circuitry, such as a processor 2101, and a memory 2102.

The processor 2101 may include one or more processing cores, and may be, for example, a 4-core processor or an 8-core processor.

The memory 2102 may include one or more computer-readable storage media. The computer-readable storage medium may be non-transient or non-transitory. The memory 2102 may further include a high-speed random access memory (RAM), and a non-volatile memory such as one or more magnetic disk storage devices and a flash memory device. In some embodiments, the non-transitory computer-readable storage medium in the memory 2102 is configured to store at least one instruction, and the at least one instruction being configured to be executed by the processor 2101 to implement the chat message display method provided in the method embodiments of this disclosure.

In some embodiments, the terminal 2100 can further include: a peripheral interface 2103, at least one peripheral, a radio frequency (RF) circuit 2104, a display screen 2105, a camera component 2106, an audio circuit 2107, a positioning component 2108, a power supply 2109, and one or more sensors 2110. Specifically, the peripheral includes: at least one of the RF circuit 2104, the touch display screen 2105, the camera component 2106, the audio circuit 2107, the positioning component 2108, and the power supply 2109.

The one or more sensors 2110 include, but are not limited to, an acceleration sensor 2111, a gyroscope sensor 2112, a pressure sensor 2113, a fingerprint sensor 2114, an optical sensor 2115, and a proximity sensor 2116.

A person skilled in the art would understand that the structure shown in FIG. 21 is not intended to constitute an limitation on the terminal 2100, and the terminal may include more or fewer components than those shown in the figure, or some components may be combined, or a different component deployment may be used.

Figure 22:
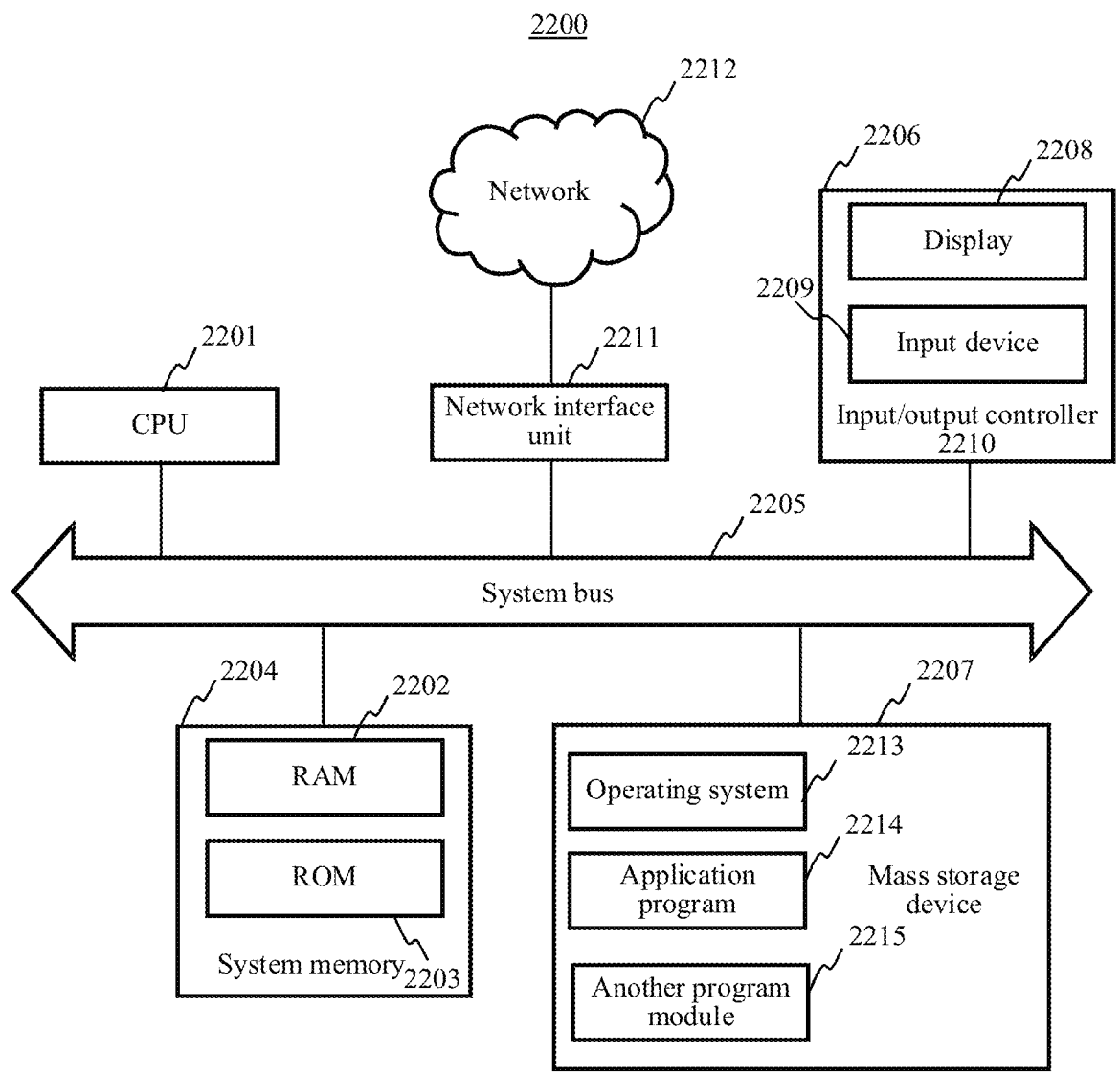
FIG. 22 is a block diagram of a server according to an embodiment of this disclosure.

FIG. 22 is a schematic structural diagram of a server 2200 according to an embodiment of this disclosure. The server is configured to implement the chat message display method provided in the foregoing embodiments.

The server 2200 includes processing circuitry, such as a central processing unit (CPU) 2201, a system memory 2204 including a RAM 2202 and a read-only memory (ROM) 2203, and a system bus 2205 connecting the system memory 2204 and the CPU 2201. The server 2200 further includes a basic Input/Output (I/O) system 2206 for transmitting information between components in a computer, and a mass storage device 2207 used for storing an operating system 2213, an application program 2214, and another program module 2215.

The basic I/O system 2206 includes a display 2208 configured to display information and an input device 2209 such as a mouse or a keyboard that is configured to input information by a user. The display 2208 and the input device 2209 are both connected to the CPU 2201 by using an input/output controller 2210 connected to the system bus 2205. The basic I/O system 2206 may further include the input/output controller 2210, to receive and process inputs from a plurality of other devices, such as the keyboard, the mouse, or an electronic stylus. Similarly, the input/output controller 2210 further provides an output to a display screen, a printer, or another type of an output device.

The mass storage device 2207 is connected to the CPU 2201 by using a mass storage controller (not shown) connected to the system bus 2205. The mass storage device 2207 and an associated computer-readable medium provide non-volatile storage for the server 2200. That is, the mass storage device 2207 may include a computer readable medium (not shown), such as a hard disk or a CD-ROM drive.

Without loss of generality, the computer-readable medium may include a computer storage medium, such as a non-transitory computer-readable storage medium, and a communication medium. The computer-storage medium includes volatile and non-volatile media, and removable and non-removable media implemented by using any method or technology used for storing information such as computer-readable instructions, data structures, program modules, or other data. The computer-storage medium includes a RAM, a ROM, an erasable programmable ROM (EPROM), an electrically erasable programmable ROM (EEPROM), a flash memory or another solid-state storage technology, a CD-ROM, a DVD or another optical storage, a magnetic cassette, a magnetic tape, or a magnetic disk storage or another magnetic storage device. It would be understood by a person skilled in the art that the computer storage medium is not limited to, the foregoing several types. The system memory 2204 and the mass storage device 2207 may be collectively referred to as a memory.

According to the embodiments of this disclosure, the server 2200 may further be connected, by using a network such as the Internet, to a remote computer on the network and run. That is, the server 2200 may be connected to a network 2212 by using a network interface unit 2211 connected to the system bus 2205, or may be connected to another type of network or a remote computer system (not shown) by using the network interface unit 2211.

The memory further includes one or more programs. The one or more programs are stored in the memory and configured to be executed by one or more processors. One or more programs include operations performed by the server in the chat message display method provided in each of the above method embodiments.

According to another aspect of this disclosure, a non-temporary, or non-transitory, computer-readable storage medium is provided, the storage medium storing a computer program, the computer program, when executed by a processor, implementing the chat message display method according to any one of the foregoing aspects.

According to another aspect of this disclosure, a computer program product is provided, the computer program product storing a computer program, the computer program, when executed by a processor, implementing the chat message display method according to any one of the foregoing aspects.

"Plurality of" mentioned in the specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

The sequence numbers of the foregoing embodiments of this disclosure are merely for the convenience of description, and do not imply the preference among the embodiments.

A person of ordinary skill in the art may understand that all or some of the steps of the foregoing embodiments may be implemented by hardware, or may be implemented a program instructing related hardware. The program may be stored in a computer-readable storage medium, such as a non-transitory computer-readable storage medium. The storage medium may be: a ROM, a magnetic disk, or an optical disc.

The foregoing descriptions are merely exemplary embodiments of this disclosure, and are not intended to limit the scope of this disclosure. Any modification, equivalent replacement, or improvement and the like made within the spirit and principle of this disclosure should fall within the protection scope of this disclosure.

What is claimed is:

1. A message display method, the method comprising:
   displaying a chat message window of a first message group, the chat message window being configured to display chat messages of the first message group from a plurality of user accounts;
   adding, by processing circuitry, a first chat message of the chat messages displayed in the chat message window of the first message group to a grouped chat message window, the grouped chat message window being configured to display a subset of chat messages from a plurality of message groups that is determined as associated with a topic of the first chat message, the plurality of message groups including the first message group, each of the plurality of message groups being associated with a respective chat message window; and
   generating, via the grouped chat message window, a reply to the first chat message added to the grouped chat message window, the reply being provided to the first message group of the chat message window.

2. The method according to claim 1, wherein
   the adding includes adding the first chat message in response to a trigger operation that is performed on the first chat message in the chat message window to add the first chat message to the grouped chat message window; and
   the method further includes displaying the first chat message in the grouped chat message window.

3. The method according to claim 1, wherein the adding the first chat message comprises:
   adding the first chat message in the chat message window to the grouped chat message window when the first chat message is determined to satisfy a preset condition.

4. The method according to claim 1, further comprising:
   displaying a message group list;
   receiving a selection of the first message group in the message group list; and
   determining the first chat message in the chat message window of the selected first message group satisfies a preset condition based on a user instruction,
   wherein the adding the first chat message includes adding the first chat message to the grouped chat message window based on the first chat message being determined to satisfy the preset condition.

5. The method according to claim 2, wherein
   the trigger operation is a topic creation operation; and
   the method further includes displaying the grouped chat message window in response to the topic creation operation, the first chat message being displayed under a new topic in the grouped chat message window.

6. The method according to claim 5, further comprising:
   receiving a topic name editing operation via the grouped chat message window; and
   displaying a topic name of the new topic in the grouped chat message window according to the topic name editing operation.

7. The method according to claim 6, further comprising:
   transmitting a topic creation request to a server, the topic creation request including the topic name;
   receiving a topic identifier of the new topic from the server; and
   transmitting a first chat message addition request to the server according to the topic identifier, the first chat message addition request being a request to store a correspondence between the first chat message and the topic name.

8. The method according to claim 2, wherein
   the trigger operation is a chat message addition operation to add the first chat message to an existing topic; and
   the method further includes displaying the grouped chat message window in response to the chat message addition operation, the first chat message being displayed under the existing topic in the grouped chat message window.

9. The method according to claim 8, further comprising:
   receiving a topic name selection operation via the grouped chat message window;

determining a target topic name of at least one existing topic according to the topic name selection operation, the at least one existing topic being created based on chat messages in other message groups; and displaying the target topic name in the grouped chat message window.

10. The method according to claim 8, further comprising:

determining a target topic name of a topic to which the first chat message belongs from topic names of at least one existing topic based on a keyword extracted from the first chat message.

11. The method according to claim 9, further comprising:

transmitting a second chat message addition request to a server, the second chat message addition request being a request to store a correspondence between the first chat message and the target topic name.

12. The method according to claim 2, wherein the first chat message is added to the topic, the topic being displayed in a message region corresponding to the first chat message in the chat message window; and the method includes:

receiving a topic viewing operation for the topic in the message region; and displaying the grouped chat message window in response to the topic viewing operation.

13. The method according to claim 1, wherein the grouped chat message window and the chat message window of the first chat message are displayed concurrently in separate display regions.

14. The method according to claim 1, wherein a message group name of the first message group is displayed in a message region corresponding to the first chat message in the grouped chat message window.

15. The method according to claim 1, wherein a reply interface is displayed in the grouped chat message window, and the generating the reply to the first chat message further includes:

receiving a reply chat message for the first chat message that is input via the reply interface, the reply chat message including at least one of text, an emoji, a file, or a link; and transmitting the reply chat message to a server.

16. The method according to claim 15, wherein a destination information setting interface is further displayed in the grouped chat message window, and the transmitting the reply chat message includes receiving a first setting operation for destination information of the reply chat message via the destination information setting interface, the destination information indicating at least one of a topic associated with the first chat message, the first message group of the first chat message, and a message group other than the first message group; and transmitting the reply chat message and the destination information to the server.

17. The method according to claim 1, wherein the adding comprises:

adding the first chat message in the chat message window to a new topic in the grouped chat message window when a semantic distance between the first chat message and a second chat message is higher than a first threshold.

18. The method according to claim 1, wherein the adding comprises:

adding the first chat message in the chat message window to an existing topic in the grouped chat message window when a semantic distance between the first chat message and a target chat message is less than a second threshold, the target chat message being a chat message under the existing topic.

19. An apparatus, comprising:

processing circuitry configured to:

display a chat message window of a first message group, the chat message window being configured to display chat messages of the first message group from a plurality of user accounts;

add a first chat message of the chat messages displayed in the chat message window of the first message group to a grouped chat message window, the grouped chat message window being configured to display a subset of chat messages from a plurality of message groups that is determined as associated with a topic of the first chat message, the plurality of message groups including the first message group, each of the plurality of message groups being associated with a respective chat message window; and generate, via the grouped chat message window, a reply to the first chat message added to the grouped chat message window, the reply being provided to the first message group of the chat message window.

20. A non-transitory computer-readable storage medium, storing instructions which when executed by a processor cause the processor to perform:

displaying a chat message window of a first message group, the chat message window being configured to display chat messages of the first message group from a plurality of user accounts;

adding a first chat message of the chat messages displayed in the chat message window of the first message group to a grouped chat message window, the grouped chat message window being configured to display a subset of chat messages from a plurality of message groups that is determined as associated with a topic of the first chat message, the plurality of message groups including the first message group, each of the plurality of message groups being associated with a respective chat message window; and generating, via the grouped chat message window, a reply to the first chat message added to the grouped chat message window, the reply being provided to the first message group of the chat message window.

* * * * *

UNITED STATES PATENT AND TRADEMARK OFFICE
CERTIFICATE OF CORRECTION

| | | |
|---|---|---|
| PATENT NO. | : 11,962,548 B2 | Page 1 of 1 |
| APPLICATION NO. | : 17/324657 | |
| DATED | : April 16, 2024 | |
| INVENTOR(S) | : Yuan Tian et al. | |

It is certified that error appears in the above-identified patent and that said Letters Patent is hereby corrected as shown below:

On the Title Page

Item (71), the Applicant City reads as:
Guangdong (CN)

Should read as:
-- Shenzhen (CN) --

Signed and Sealed this
Third Day of September, 2024

Katherine Kelly Vidal
*Director of the United States Patent and Trademark Office*